United States Patent
Balupari

(10) Patent No.: US 12,301,605 B2
(45) Date of Patent: *May 13, 2025

(54) EFFICIENT SUBORDINATE REQUEST WEB PAGE LOGGING

(71) Applicant: Netskope, Inc., Santa Clara, CA (US)

(72) Inventor: Ravindra K. Balupari, San Jose, CA (US)

(73) Assignee: Netskope, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/664,884

(22) Filed: May 15, 2024

(65) Prior Publication Data
US 2024/0297890 A1    Sep. 5, 2024

Related U.S. Application Data

(63) Continuation of application No. 18/306,602, filed on Apr. 25, 2023, now Pat. No. 12,021,887, which is a continuation of application No. 17/093,539, filed on Nov. 9, 2020, now Pat. No. 11,757,908, which is a continuation of application No. 16/044,326, filed on Jul. 24, 2018, now Pat. No. 10,834,113.

(60) Provisional application No. 62/536,937, filed on Jul. 25, 2017.

(51) Int. Cl.
*H04L 67/02* (2022.01)
*H04L 9/40* (2022.01)
*H04L 67/10* (2022.01)

(52) U.S. Cl.
CPC ...... *H04L 63/1425* (2013.01); *H04L 63/0236* (2013.01); *H04L 63/101* (2013.01); *H04L 67/02* (2013.01); *H04L 67/10* (2013.01)

(58) Field of Classification Search
CPC ............ H04L 63/1425; H04L 63/0236; H04L 63/101; H04L 67/02; H04L 67/10
See application file for complete search history.

(56) References Cited

U.S. PATENT DOCUMENTS

| | | |
|---|---|---|
| 5,440,723 A | 8/1995 | Arnold et al. |
| 6,513,122 B1 | 1/2003 | Magdych et al. |
| 6,622,248 B1 | 9/2003 | Hirai |
| 7,080,408 B1 | 7/2006 | Pak et al. |
| 7,298,864 B2 | 11/2007 | Jones |

(Continued)

FOREIGN PATENT DOCUMENTS

EP    1063833 A2    12/2000

OTHER PUBLICATIONS

Martin, Victoria "Cooperative Security Fabric," The Fortinet Cookbook, Jun. 8, 2016, 6 pgs., archived Jul. 28, 2016 at https://web.archive.org/web/20160728170025/http://cookbook.fortinet.com/cooperative-security-fabric-54.

(Continued)

*Primary Examiner* — Stephen T Gundry

(57) ABSTRACT

The technology disclosed works in real time, as base and subordinate HTTP and HTTPS URL requests are received, to attribute subordinate requests to base web pages. The main case uses the "referrer" or "referrer" HTTP header field for attribution, directly and through a referrer hierarchy to the base web page. A second case, which minimizes false generation of base web page log entries, involves small files, such as cascading style sheets (CSS) files, that often have a blank or no referrer field.

20 Claims, 21 Drawing Sheets
(9 of 21 Drawing Sheet(s) Filed in Color)

(56) References Cited

U.S. PATENT DOCUMENTS

| | | | |
|---|---|---|---|
| 7,376,719 B1 | 5/2008 | Shafer et al. | |
| 7,735,116 B1 | 6/2010 | Gauvin | |
| 7,953,850 B2* | 5/2011 | Mani | H04L 67/125 |
| | | | 709/224 |
| 7,962,582 B2* | 6/2011 | Potti | H04L 63/102 |
| | | | 370/400 |
| 7,966,654 B2 | 6/2011 | Crawford | |
| 8,000,329 B2 | 8/2011 | Fendick et al. | |
| 8,151,323 B2* | 4/2012 | Harris | H04L 67/06 |
| | | | 726/13 |
| 8,296,178 B2 | 10/2012 | Hudis et al. | |
| 8,429,630 B2* | 4/2013 | Nickolov | H04L 67/1021 |
| | | | 717/148 |
| 8,515,918 B2* | 8/2013 | Borders | G06F 21/606 |
| | | | 726/22 |
| 8,793,151 B2 | 7/2014 | DelZoppo et al. | |
| 8,839,417 B1 | 9/2014 | Jordan | |
| 9,185,125 B2* | 11/2015 | Varsanyi | G06F 21/552 |
| 9,197,601 B2 | 11/2015 | Pasdar | |
| 9,225,734 B1 | 12/2015 | Hastings | |
| 9,231,968 B2 | 1/2016 | Fang et al. | |
| 9,280,678 B2 | 3/2016 | Redberg | |
| 9,438,488 B2* | 9/2016 | Joshi | H04L 43/026 |
| 9,680,946 B2* | 6/2017 | Angeles | G06F 11/3495 |
| 9,692,725 B2* | 6/2017 | Venkatraman | H03M 7/30 |
| 9,742,866 B2* | 8/2017 | Shribman | H04L 67/06 |
| 9,811,662 B2 | 11/2017 | Sharpe et al. | |
| 10,084,825 B1 | 9/2018 | Xu | |
| 10,237,282 B2 | 3/2019 | Nelson et al. | |
| 10,243,997 B2* | 3/2019 | Desai | H04L 67/02 |
| 10,334,442 B2 | 6/2019 | Vaughn et al. | |
| 10,382,468 B2 | 8/2019 | Dods | |
| 10,484,334 B1 | 11/2019 | Lee et al. | |
| 10,826,941 B2 | 11/2020 | Jain et al. | |
| 11,032,301 B2 | 6/2021 | Mandrychenko et al. | |
| 11,036,856 B2 | 6/2021 | Graun et al. | |
| 11,281,775 B2 | 3/2022 | Burdett et al. | |
| 2002/0099666 A1 | 7/2002 | Dryer et al. | |
| 2003/0055994 A1 | 3/2003 | Herrmann et al. | |
| 2003/0063321 A1 | 4/2003 | Inoue et al. | |
| 2003/0172292 A1 | 9/2003 | Judge | |
| 2003/0204632 A1 | 10/2003 | Willebeek-LeMair et al. | |
| 2004/0015719 A1 | 1/2004 | Lee et al. | |
| 2005/0010593 A1 | 1/2005 | Fellenstein et al. | |
| 2005/0271246 A1 | 12/2005 | Sharma et al. | |
| 2006/0112174 A1* | 5/2006 | L'Heureux | H04L 67/565 |
| | | | 709/225 |
| 2006/0156401 A1 | 7/2006 | Newstadt et al. | |
| 2007/0156919 A1* | 7/2007 | Potti | H04L 63/12 |
| | | | 709/238 |
| 2007/0204018 A1 | 8/2007 | Chandra et al. | |
| 2007/0237147 A1 | 10/2007 | Quinn et al. | |
| 2007/0245409 A1* | 10/2007 | Harris | H04L 67/06 |
| | | | 726/5 |
| 2008/0069480 A1 | 3/2008 | Aarabi et al. | |
| 2008/0134332 A1 | 6/2008 | Keohane et al. | |
| 2009/0144818 A1 | 6/2009 | Kumar et al. | |
| 2009/0249470 A1 | 10/2009 | Litvin et al. | |
| 2009/0276771 A1* | 11/2009 | Nickolov | G06Q 30/04 |
| | | | 718/1 |
| 2009/0300351 A1 | 12/2009 | Lei et al. | |
| 2010/0017436 A1 | 1/2010 | Wolge | |
| 2011/0078309 A1* | 3/2011 | Bloch | H04L 63/168 |
| | | | 709/224 |
| 2011/0119481 A1 | 5/2011 | Auradkar et al. | |
| 2011/0145594 A1 | 6/2011 | Jho et al. | |
| 2012/0278896 A1 | 11/2012 | Fang et al. | |
| 2013/0159694 A1 | 6/2013 | Chiueh et al. | |
| 2013/0298190 A1 | 11/2013 | Sikka et al. | |
| 2013/0347085 A1 | 12/2013 | Hawthorn et al. | |
| 2014/0013112 A1 | 1/2014 | Cidon et al. | |
| 2014/0068030 A1 | 3/2014 | Chambers et al. | |
| 2014/0068705 A1 | 3/2014 | Chambers et al. | |
| 2014/0173061 A1* | 6/2014 | Lipstone | H04L 41/50 |
| | | | 709/220 |
| 2014/0222984 A1* | 8/2014 | Varney | G06F 15/173 |
| | | | 709/223 |
| 2014/0259093 A1 | 9/2014 | Narayanaswamy et al. | |
| 2014/0282843 A1 | 9/2014 | Buruganahalli et al. | |
| 2014/0317738 A1* | 10/2014 | Be'ery | H04L 63/30 |
| | | | 726/23 |
| 2014/0317739 A1* | 10/2014 | Be'ery | H04L 63/14 |
| | | | 726/23 |
| 2014/0359282 A1 | 12/2014 | Shikfa et al. | |
| 2014/0366079 A1 | 12/2014 | Pasdar | |
| 2015/0100357 A1 | 4/2015 | Seese et al. | |
| 2015/0180891 A1* | 6/2015 | Seward | H04L 63/1416 |
| | | | 726/22 |
| 2015/0281386 A1* | 10/2015 | Angeles | G06F 16/95 |
| | | | 705/30 |
| 2016/0105530 A1* | 4/2016 | Shribman | H04L 65/612 |
| | | | 709/218 |
| 2016/0323318 A1 | 11/2016 | Terrill et al. | |
| 2016/0350145 A1 | 12/2016 | Botzer et al. | |
| 2017/0064005 A1 | 3/2017 | Lee | |
| 2017/0085583 A1* | 3/2017 | Torres | H04L 63/14 |
| 2017/0093917 A1 | 3/2017 | Chandra et al. | |
| 2017/0250951 A1 | 8/2017 | Wang et al. | |
| 2020/0050686 A1 | 2/2020 | Kamalapuram et al. | |

OTHER PUBLICATIONS

Huckaby, Jeff "Ending Clear Text Protocols," Rackaid.com, Dec. 9, 2008, 3 pgs.

Newton, Harry "fabric," Newton's Telecom Dictionary, 30th Updated, Expanded, Anniversary Edition, 2016, 3 pgs.

Fortinet, "Fortinet Security Fabric Earns 100% Detection Scores Across Several Attack Vectors in NSS Labs' Latest Breach Detection Group Test [press release]", Aug. 2, 2016, 4 pgs, available at https://www.fortinet.com/de/corporate/about-us/newsroom/press-releases/2016/security-fabric-earns-100-percent-breach-detection-scores-nss-labs.

Fortinet, "Fortinet Security Fabric Named 2016 CRN Network Security Product of the Year [press release]", Dec. 5, 2016, 4 pgs, available at https://www.fortinet.com/corporate/about-us/newsroom/press-releases/2016/fortinet-security-fabric-named-2016-crn-network-security-product.

McCullagh, Declan, "How safe is instant messaging? A security and privacy survey," CNET, Jun. 9, 2008, 14 pgs.

Beck et al., "IBM and Cisco: Together for a World Class Data Center," IBM Redbooks, Jul. 2013, 654 pgs.

Martin, Victoria "Installing internal FortiGates and enabling a security fabric," The Fortinet Cookbook, Jun. 8, 2016, 11 pgs, archived Aug. 28, 2016 at https://web.archive.org/web/20160828235831/http://cookbook.fortinet.com/installing-isfw-fortigate-enabling-csf-54/.

Zetter, Kim, "Revealed: The Internet's Biggest Security Hole," Wired, Aug. 26, 2008, 13 pgs.

Adya et al., "Farsite: Federated, available, and reliable storage for an incompletely trusted environment," SIGOPS Oper. Syst. Rev. 36, SI, Dec. 2002, pp. 1-14.

Agrawal et al., "Order preserving encryption for numeric data," In Proceedings of the 2004 ACM SIGMOD international conference on Management of data, Jun. 2004, pp. 563-574.

Balakrishnan et al., "A layered naming architecture for the Internet," ACM SIGCOMM Computer Communication Review, 34(4), 2004, pp. 343-352.

Downing et al., Naming Dictionary of Computer and Internet Terms, (11th Ed.) Barron's, 2013, 6 pgs.

Downing et al., Dictionary of Computer and Internet Terms, (10th Ed.) Barron's, 2009, 4 pgs.

Zoho Mail, "Email Protocols: What they are & their different types," 2006, 7 pgs. available at https://www.zoho.com/mail/glossary/email-protocols.html#:~:text=mode of communication.-,What are the different email protocols%3F, and also has defined functions.

Niit, Special Edition Using Storage Area Networks, Que, 2002, 6 pgs.

(56) References Cited

OTHER PUBLICATIONS

Chapple, Mike, "Firewall redundancy: Deployment scenarios and benefits," TechTarget, 2005, 5 pgs. available at https://www.techtarget.com/searchsecurity/tip/Firewall-redundancy-Deployment-scenarios-and-benefits?Offer=abt_pubpro_AI-Insider.
Fortinet, FortiGate—3600 User Manual (vol. 1, Version 2.50 MR2) Sep. 5, 2003, 329 pgs.
Fortinet, FortiGate SOHO and SMB Configuration Example, (Version 3.0 MR5), Aug. 24, 2007, 54 pgs.
Fortinet, FortiSandbox—Administration Guide, (Version 2.3.2), Nov. 9, 2016, 191 pgs.
Fortinet, FortiSandbox Administration Guide, (Version 4.2.4) Jun. 12, 2023, 245 pgs. available at https://fortinetweb.s3.amazonaws.com/docs.fortinet.com/v2/attachments/fba32b46-b7c0-11ed-8e6d-fa163e15d75b/FortiSandbox-4.2.4-Administration_Guide.pdf.
Fortinet, FortiOS—Administration Guide, (Versions 6.4.0), Jun. 3, 2021, 1638 pgs.
Heady et al., "The Architecture of a Network Level Intrusion Detection System," University of New Mexico, Aug. 15, 1990, 21 pgs.
Kephart et al., "Fighting Computer Viruses," Scientific American (vol. 277, No. 5) Nov. 1997, pp. 88-93.
Wang, L., Chapter 5: Cooperative Security in D2D Communications, "Physical Layer Security in Wireless Cooperative Networks," 41 pgs. first online on Sep. 1, 2017 at https://link.springer.com/chapter/10.1007/978-3-319-61863-0_5.
Lee et al., "A Data Mining Framework for Building Intrusion Detection Models," Columbia University, n.d. 13 pgs.
Merriam-Webster Dictionary, 2004, 5 pgs.
Microsoft Computer Dictionary, (5th Ed.), Microsoft Press, 2002, 8 pgs.
Microsoft Computer Dictionary, (4th Ed.), Microsoft Press, 1999, 5 pgs.
Mika et al., "Metadata Statistics for a Large Web Corpus," LDOW2012, Apr. 16, 2012, 6 pgs.
Oxford Dictionary of Computing (6th Ed.), 2008, 5 pgs.
Paxson, Vern, "Bro: a System for Detecting Network Intruders in Real-Time," Proceedings of the 7th USENIX Security Symposium, Jan. 1998, 22 pgs.
Fortinet Inc., U.S. Appl. No. 62/503,252, "Building a Cooperative Security Fabric of Hierarchically Interconnected Network Security Devices." n.d., 87 pgs.
Song et al., "Practical techniques for searches on encrypted data," In Proceeding 2000 IEEE symposium on security and privacy. S&P 2000, May 2000, pp. 44-55.
Dean, Tamara, Guide to Telecommunications Technology, Course Technology, 2003, 5 pgs.
U.S. Appl. No. 60/520,577, "Device, System, and Method for Defending a Computer Network," Nov. 17, 2003, 21 pgs.
U.S. Appl. No. 60/552,457, "Fortinet Security Update Technology," Mar. 2004, 6 pgs.
Tittel, Ed, Unified Threat Management For Dummies, John Wiley & Sons, Inc., 2012, 76 pgs.
Fortinet, FortiOS Handbook: UTM Guide (Version 2), Oct. 15, 2010, 188 pgs.
Full Definition of Security, Wayback Machine Archive of Merriam-Webster on Nov. 17, 2016, 1 pg.
Definition of Cooperative, Wayback Machine Archive of Merriam-Webster on Nov. 26, 2016, 1 pg.
Pfaffenberger, Bryan, Webster's New World Computer Dictionary, (10th Ed.), 2003, 5 pgs.
European Application No. 21191734.9 Communication pursuant to Article 94(3) EPC mailed Dec. 18, 2024, 4 pages.

\* cited by examiner

Base URL 302

FIG. 3A

Base Page 300A   Child URL 402

FIG. 4A

| | Request URL | Referer URL | Classification |
|---|---|---|---|
| HTTP Request 1: | https://www.box.com | Referer: NULL | Base URL |
| HTTP Request 2: | https://app.box.com | Referer: https://www.box.com | Child URL |
| HTTP Request 3: | https://newdomain.com | Referer: https://app.box.com | Grandchild URL |
| HTTP Request 4: | https://test.com | Referer: https://newdomain.com | Gr. Grandchild URL |

Requests 1-4 are logged under one page event with page URL set as base URL "https://www.box.com"

FIG. 5C netskope Dashboard  Analytics  Policies  Skope IT

EVENTS (31,411)   ALERTS (5,526)

🔍 http_transaction_count gt 50

| Time | User Location | User | Site | Category | Total Bytes |
|---|---|---|---|---|---|
| 11/8/16 11:53:16 | Los Altos, California | 192.168.69.2 | ndtv | Finance | 862.28 KB |
| 11/8/16 11:46:29 | Fresno, California | 191.148.21.1 | cnn | News | 526.18 KB |
| 11/8/16 11:42:11 | Tracy, California | 199.113.15.9 | facebook | Social media | 998.98 KB |
| 11/8/16 11:39:28 | Los Altos, California | 192.168.65.2 | espn | Sports | 852.15 KB |
| 11/8/16 11:35:56 | Palo Alto, California | 194.142.69.12 | youtube | Streaming media | 2094.56 KB |
| 11/8/16 11:20:34 | Los Gatos, California | 196.179.42.111 | instagram | Social media | 1452.82 KB |
| 11/8/16 11:12:57 | Burlingame, California | 193.123.22.56 | linkedin | Networking | 521.09 KB |
| 11/8/16 11:04:15 | Belmont, California | 190.159.42.4 | bing | Search | 414.16 KB |

EFFICIENT SUBORDINATE REQUEST WEB PAGE LOGGING

PRIORITY DATA

This application claims the benefit of and priority to U.S. patent application Ser. No. 18/306,602, titled "COMPACT LOGGING FOR CLOUD AND WEB SECURITY," filed Apr. 25, 2023, which is a continuation of U.S. patent application Ser. No. 17/093,539, titled "COMPACT LOGGING FOR CLOUD AND WEB SECURITY," filed Nov. 9, 2020, issued as U.S. Pat. No. 11,757,908 on Sep. 12, 2023, which is a continuation of U.S. patent application Ser. No. 16/044,326, titled "COMPACT LOGGING OF NETWORK TRAFFIC EVENTS," filed Jul. 24, 2018, issued as U.S. Pat. No. 10,834,113 on Nov. 10, 2020, which claims the benefit of U.S. Provisional Patent Application No. 62/536,937, titled "COMPACT LOGGING OF NETWORK TRAFFIC EVENTS," filed Jul. 25, 2017, each of which are incorporated by reference in their entirety for all purposes.

CROSS-REFERENCE TO OTHER APPLICATIONS

This application is related to U.S. Nonprovisional patent application Ser. No. 14/198,499, titled "Security For Network Delivered Services," filed on Mar. 5, 2014, issued as U.S. Pat. No. 9,398,102 on Jul. 19, 2016, which is incorporated by reference for all purposes;

This application is related to U.S. Nonprovisional patent application Ser. No. 14/835,640, titled "Systems And Methods of Monitoring and Controlling Enterprise Information Stored on a Cloud Computing Service (CCS)," filed on Aug. 25, 2015, issued as U.S. Pat. No. 9,928,377 on Mar. 27, 2018, which is incorporated by reference for all purposes;

This application is related to U.S. Nonprovisional patent application Ser. No. 15/368,240, titled "Systems and Methods of Enforcing Multi-Part Policies on Data-Deficient Transactions of Cloud Computing Services," filed on Dec. 2, 2016, issued as U.S. Pat. No. 10,826,940 on Nov. 3, 2020, which is incorporated by reference for all purposes;

This application is related to U.S. Provisional Patent Application No. 62/488,703, titled "Reducing Latency and Error in Security Enforcement by a Network Security System (NSS)," filed on Apr. 21, 2017, which is incorporated by reference for all purposes; and This application is related to U.S. Provisional Patent Application No. 62/524,979, titled "Aggregate Network Traffic Monitoring", filed on Jun. 26, 2017, which is incorporated by reference for all purposes.

FIELD OF THE TECHNOLOGY DISCLOSED

The technology disclosed relates to compact logging of network traffic events, and in particular, relates to using HTTP referrer (or referrer) header field to accurately attribute subordinate HTTP URL requests to correct requesting base web pages in real time.

BACKGROUND

When a browser receives a unified resource locator (URL) request to load a base web page, it sends a Hypertext Transfer Protocol (HTTP) request to the web server for the base web page. As the HyperText Markup Language (HTML) is delivered, the browser parses it and looks for references to additional resources like images, scripts, CSS, and Flash. Every time the browser finds a new resource in the HTML, it sends a subordinate HTTP request to the web server.

Logging significant number of subordinate HTTP requests can be challenging and inefficient. An opportunity arises to compactly log subordinate HTTP requests by accurately attributing them to the correct requesting base web page in real time. Storage and computational efficiencies and improved user experience may result.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The color drawings also may be available in PAIR via the Supplemental Content tab.

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 3A shows an example of a base web page loaded for a base URL.

FIG. 4A shows a child web page loaded for a child URL located on the base web page.

FIG. 5C shows how the HTTP referrer field is used to compactly log child and grandchild URLs under the base URL.

FIG. 7A illustrates an example management interface with base URLs logged as events.

FIG. 7C depicts an example management interface that has base and subordinate URLs logged as alerts in accordance with a policy.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The discussion is organized as follows. First, an introduction describing some of the technical problems addressed by various implementations is presented. Then, a high-level description of one implementation is discussed at an architectural level. Next, the algorithms used by some implementations to provide compact logging are discussed. Lastly, more detailed architectures for implementing the system, together with management interfaces, data structures, and message sequence diagrams are discussed.

Introduction

Log entries for base web pages are noisy and difficult to read, because an average website makes 100 subordinate Hypertext Transfer Protocol (HTTP) requests which are 2128 kB in size and come from 18 different domains, according to the HTTP Archive. The subordinate HTTP requests are from objects on the base web page and nested within objects on the base web page. Ads, trackers, and analytic helpers are particularly uninteresting, in most log review activities.

Requests for base web pages and gross statistics about base web pages can be summarized with much less noise and distraction, if a logging activity can accurately attribute in real time, each subordinate HTTP unified resource locator (URL) request to the correct requesting base web page. This attribution is complicated by nesting of requests within requests within requests.

The technology disclosed works in real time, as base and subordinate HTTP URL requests are received, to attribute subordinate HTTP URL requests to base web pages. The main case uses the "referrer" or "referrer" HTTP header field for attribution, directly and through a referrer hierarchy to the base web page. A second case, which minimizes false generation of base web page log entries, involves small files, such as cascading style sheets (CSS) files, that often have a blank or no referrer field.

Instead of separately logging subordinate HTTP URL requests, the technology disclosed accumulates statistics for groups of subordinate HTTP URL requests and attributes them to the appropriate base web page. When the base web page log item is generated, such as upon closing of a TCP connection, the statistics are persisted with the base web page log entry. Special handling of persistent connections is provided.

The technology disclosed applies to both HTTP data (e.g., HTTP transactions, requests, and/or events) and hypertext transfer protocol secure (HTTPS) data (e.g., HTTPS transactions, requests, and/or events) secured by secure sockets layer (SSL) or transport layer security (TLS).

System Overview

Figure 1:
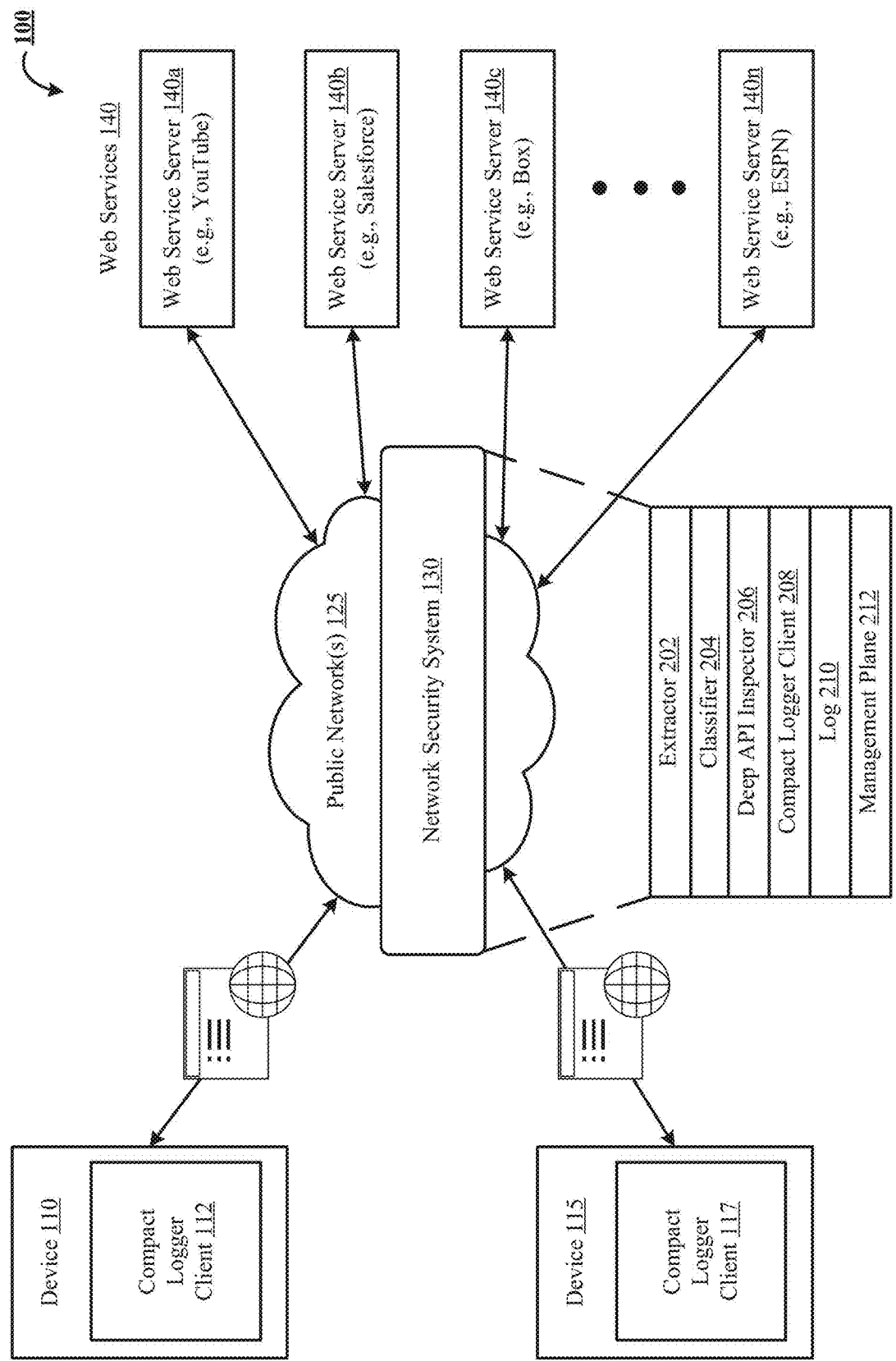
FIG. 1 illustrates an architectural level schematic of a system in which a compact logger client compactly logs network traffic events.

We describe a system and various implementations for compact logging of network traffic events. The system and processes are described with reference to FIG. 1 showing an architectural level schematic of a system in accordance with an implementation. Because FIG. 1 is an architectural diagram, certain details are intentionally omitted to improve the clarity of the description. The discussion of FIG. 1 is organized as follows. First, the elements of the figure are described, followed by their interconnections. Then, the use of the elements in the system is described in greater detail.

FIG. 1 includes the system 100. The system 100 includes devices 110 and 115, public network(s) 125, network security system 130, and web services 140. Devices 110 and 115 include compact logger clients 112 and 117 respectively. System 100 also includes web services 140 like YouTube™, Salesforce™, Box™, and ESPN™ that run on respective web service servers 140a, 140b, 140c, and 140n.

Figure 2:
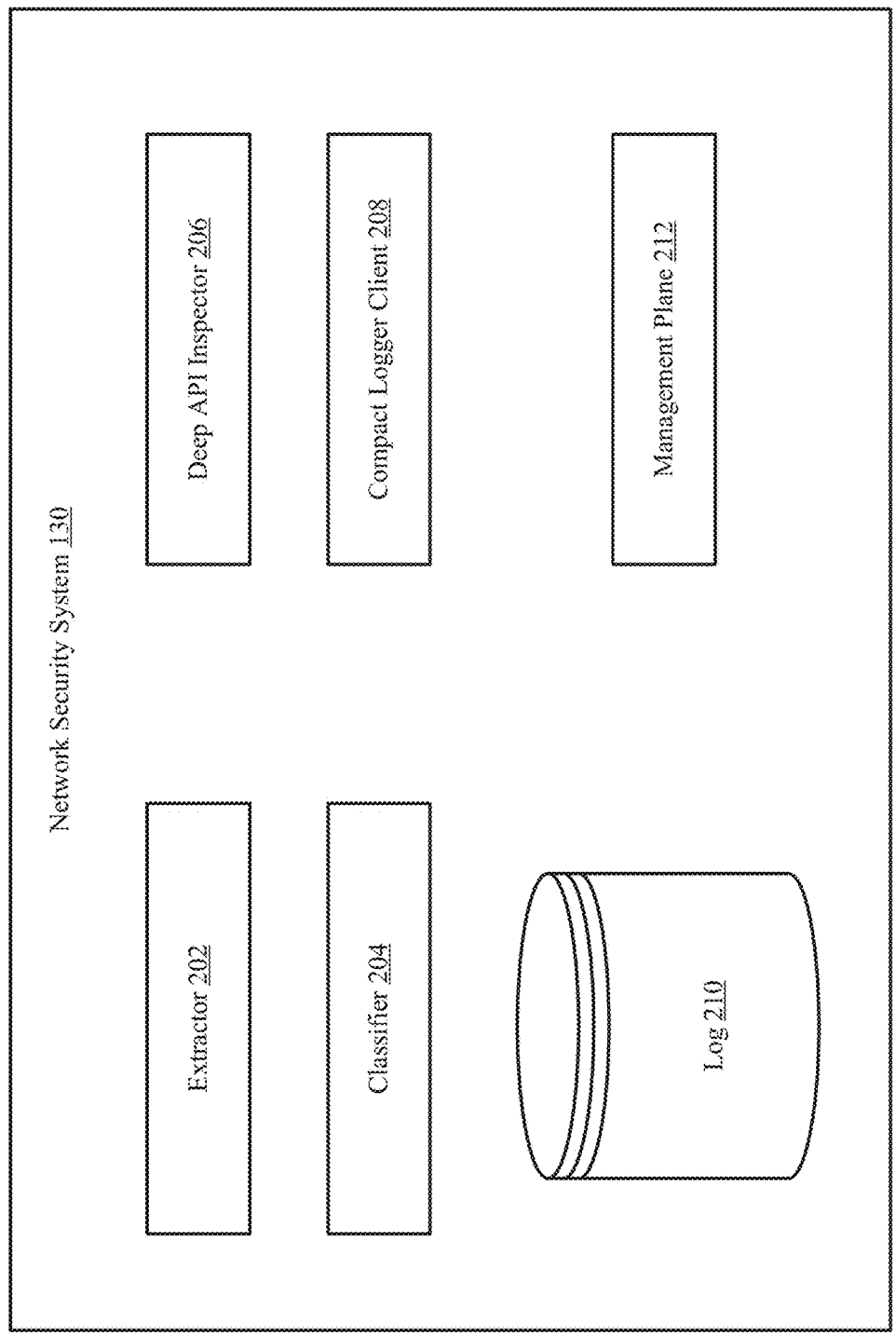
FIG. 2 is a block diagram of example modules of the network security system.

The network security system 130 is interposed between the devices 110 and 115 and the web services 140. It can be cloud-based or on-premise. FIG. 2 is a block diagram 200 of example modules of the network security system 130. These include extractor 202, classifier 204, deep API inspector 206, compact logger client 208, log 210, and management plane 212. In implementations, the network security system 130 serves as a proxy.

The interconnections of the elements of system 100 are now described. The public network(s) 125 couples the devices 110 and 115, the network security system 130, and the web services 140, all in communication with each other (indicated by solid double-arrowed lines). The actual communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications. Devices 110 and 115 can be desktop computers, laptops, tablet computers, mobile phones, or any other type of computing devices. The engines of system 100 such as the network security system 130 are implemented by software running on varying types of computing devices. Example devices are a workstation, a server, a computing cluster, a blade server, and a server farm.

Having described the elements of FIG. 1 and their interconnections, elements of the figure are now described in greater detail. Devices 110 and 115 are configured with an endpoint routing client (not shown) that reroutes network traffic via the network security system 130. Depending on the type of device, the endpoint routing client can be a virtual private network (VPN) such as VPN-on-demand or per-app-VPN that use certificate-based authentication. For example, for iOS™ devices, it can be a per-app-VPN or can be a set of domain-based VPN profiles. For Android™ devices, it can be a cloud director mobile app. For Windows™ devices, it can be a per-app-VPN or can be a set of domain-based VPN profiles. Endpoint routing client can also be an agent that is downloaded using e-mail or silently installed using mass deployment tools like ConfigMgr™, Altris™, and Jamf™.

Network Security System

When users of devices 110 and 115 attempt to access web services 140, the network security system 130 intermediates communications between the devices 110 and 115 and the web services 140. Of particular note is that requests, such as a web browser request for a URL of a web service, are routed atypically. Specifically, the endpoint routing client running on the devices 110 and 115 identifies the request and securely tunnels the request to the network security system 130 rather than to the web services 140. Among other things, the network security system 130 analyzes a user identity associated with the devices 110 and 115 and the applicable policy before routing the request to the web services 140. Notably, from the perspective of the web services 140, the request go back to the network security system 130, rather than directly to the devices 110 and 115. The network security system 130 can analyze the returned data, apply further policies in a user identity dependent fashion and then return the response from the web services 140 to the devices 110 and 115.

Compact Logger Client

System 100 also includes compact logger clients that perform the compact logging of network traffic events. Compact logging can occur at the client-side and/or at the server-side. In a client side implementation, the compact logger clients operate at the devices 110 and 115, such as compact logger clients 112 and 117. In a server side implementation, the compact logger clients operate at the network security system 130, such as compact logger client 208. The device running the compact logger client can be a same device from which the HTTP requests originated (e.g., compact logger clients 112 and 117). The device running the compact logger client can also be a campus-based routing appliance positioned to actively process the HTTP requests. The device running the compact logger client can be a cloud-based server (e.g., network security system 130) to which an endpoint routing client, running on a same device from which the HTTP requests originated, routes the HTTP requests (e.g., compact logger client 208). The device running the compact logger client can also be a cloud-based server (e.g., network security system 130) to which an endpoint routing client, running on a same device from which the HTTP requests originated, routes selected HTTP requests that are not exempted by a bypass list (e.g., compact logger client 208). Instances of the compact logger client can run on both: (1) a same device from which the HTTP requests originated and (2) a cloud-based server to which an endpoint routing client, running on the same device from which the HTTP requests originated, routes selected HTTP requests that are not exempted by the bypass list.

Base and Subordinate URLs

Figure 3A:
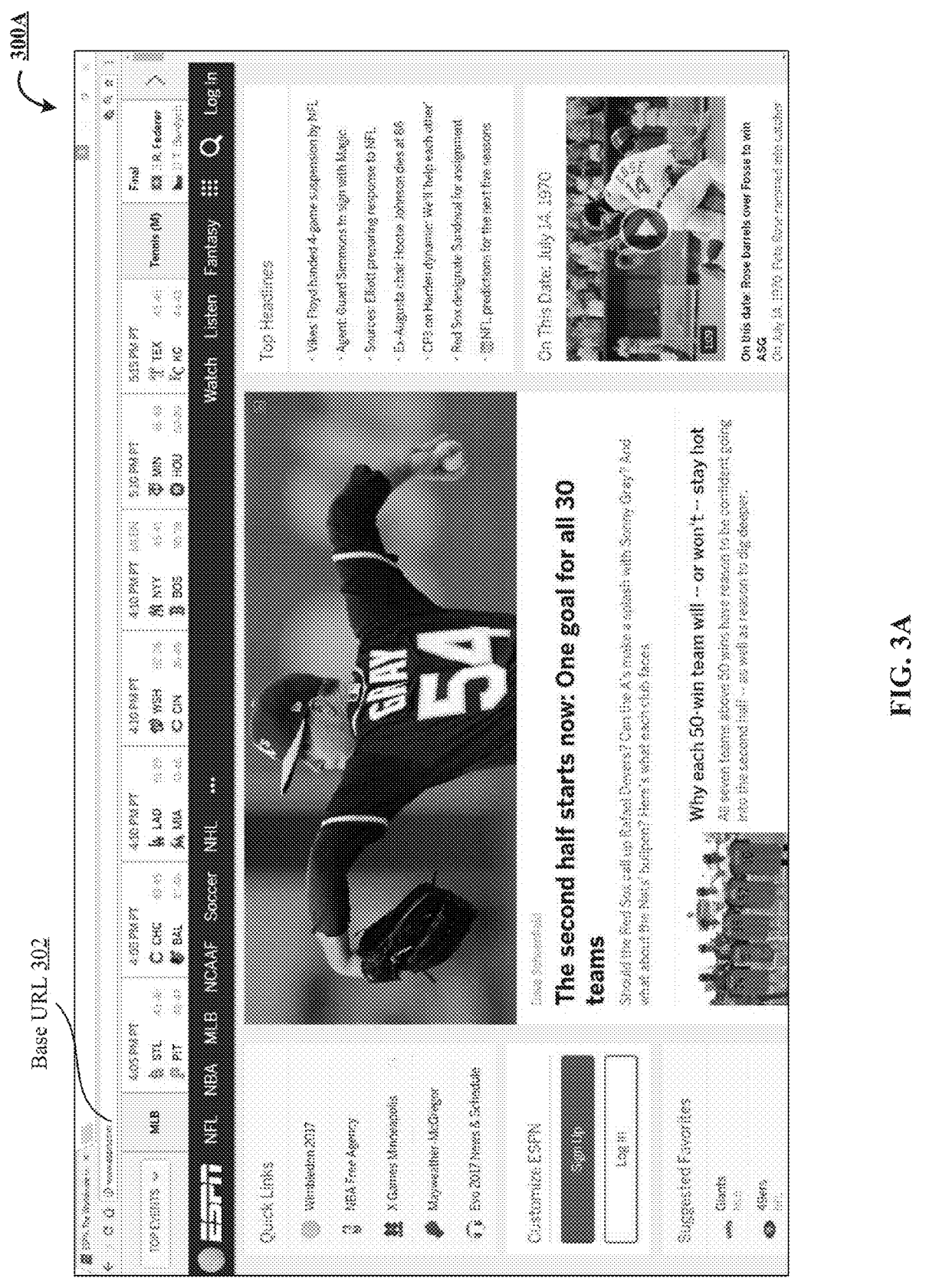

A general view of how the compact logger client functions has been provided. The discussion now focuses on how the compact logger client detects base URLs, child URLs, and grandchild URLs, and selectively logs some of the URLs. FIG. 3A shows an example of a base web page 300A loaded for a base URL 302 "www.espn.com". When a browser running on a device receives the base URL 302, it sends an HTTP request to the corresponding web server for the base web page 300A. As the HTML for the base web page 300A is delivered, the browser parses it and looks for references to additional resources like frames, subframes (iframe), stylesheets (CSS), scripts (JS), images, fonts, media, XHRs (AJAX), websockets, objects (Flash), CSP reports, and pings. Every time the browser finds a new resource in the HTML of the base web page 300A, it sends a so-called subordinate HTTP request to the web server. As part of the subordinate HTTP requests, so-called subordinate URLs are used to locate and retrieve the additional resources from the web server.

Figure 3B:
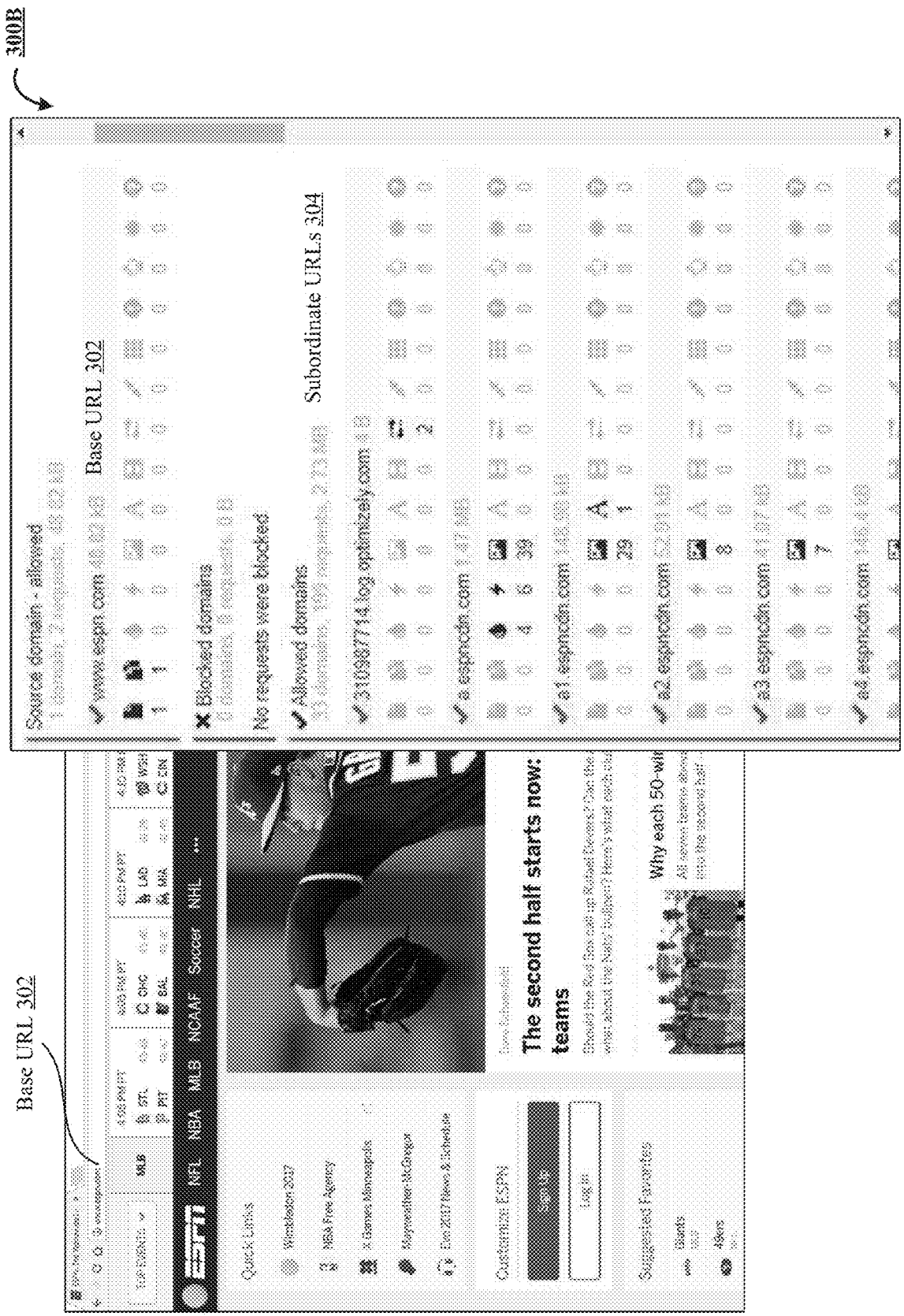
FIG. 3B graphically depicts some of the subordinate URLs requested for the base web page.

FIG. 3B is a graphical depiction 300B of some of the subordinate URLs 304 requested for the base web page 300A. These include "310987714.log.optimizely.com", "a.espncdn.com", "a1.espncdn.com", "a2.espncdn.com", and others. In another example, the following is a sample of subordinate URLs for which subordinate HTTP requests are made when loading the base URL "www.cnn.com":

| | | |
|---|---|---|
| 0914.global.ssl.fastly.net | a125375509.cdn.optimizely.com | ad.afy11.net |
| ad.doubleclick.net | bea4.cnn.com | cdn.optimizely.com |
| ads.rubiconproject.com | bea4.v.fwmrm.net | cdn3.optimizely.com |
| ads.undertone.com | beacon.krxd.net | cdns.us1.gigya.com |
| amplifypixel.outbrain.com | c.amazon-adsystem.com | code.jquery.com |
| api.bounceexchange.com | cdn.gigya.com | connect.facebook.net |
| b.scorecardresearch.com | cdn.krxd.net | d3qdfnco3bamip.cloudfront.net |
| bat.bing.com | cdn.livefyre.com | data.cnn.com |
| errors.client.optimizely.com | match.adsrvr.org | rtd.tubemogul.com |
| googleads.g.doubleclick.net | metrics.cnn.com | securepubads.g.doubleclick.net |
| hpr.outbrain.com | mms.cnn.com | social-login.cnn.com |
| i.cdn.cnn.com | native.sharethrough.com | ssl.cdn.turner.com |
| i2.cdn.cnn.com | odb.outbrain.com | static.chartbeat.com |
| images.outbrain.com | pg-act-11-o.s3-us-west-2.amazonaws.com | staticxx.facebook.com |
| img.bleacherreport.net | ping.chartbeat.net | tag.bounceexchange.com |
| log.outbrain.com | pixel.mathtag.com | tpc.googlesyndication.com |
| logx.optimizely.com | podcasts.cnn.net | usermatch.krxd.net |
| mab.chartbeat.com | rtax.criteo.com | usersync.videoamp.com |

| | | |
|---|---|---|
| w.usabilla.com | www.facebook.com | www.i.cdn.cnn.com |
| weather.api.cnn.io | www.google-analytics.com | z.cdn.turner.com |
| widgets.outbrain.com | www.google.com | www.googletagservices.com |
| www.decenthat.com | | |

HTTP Referer Field

Figure 3C:
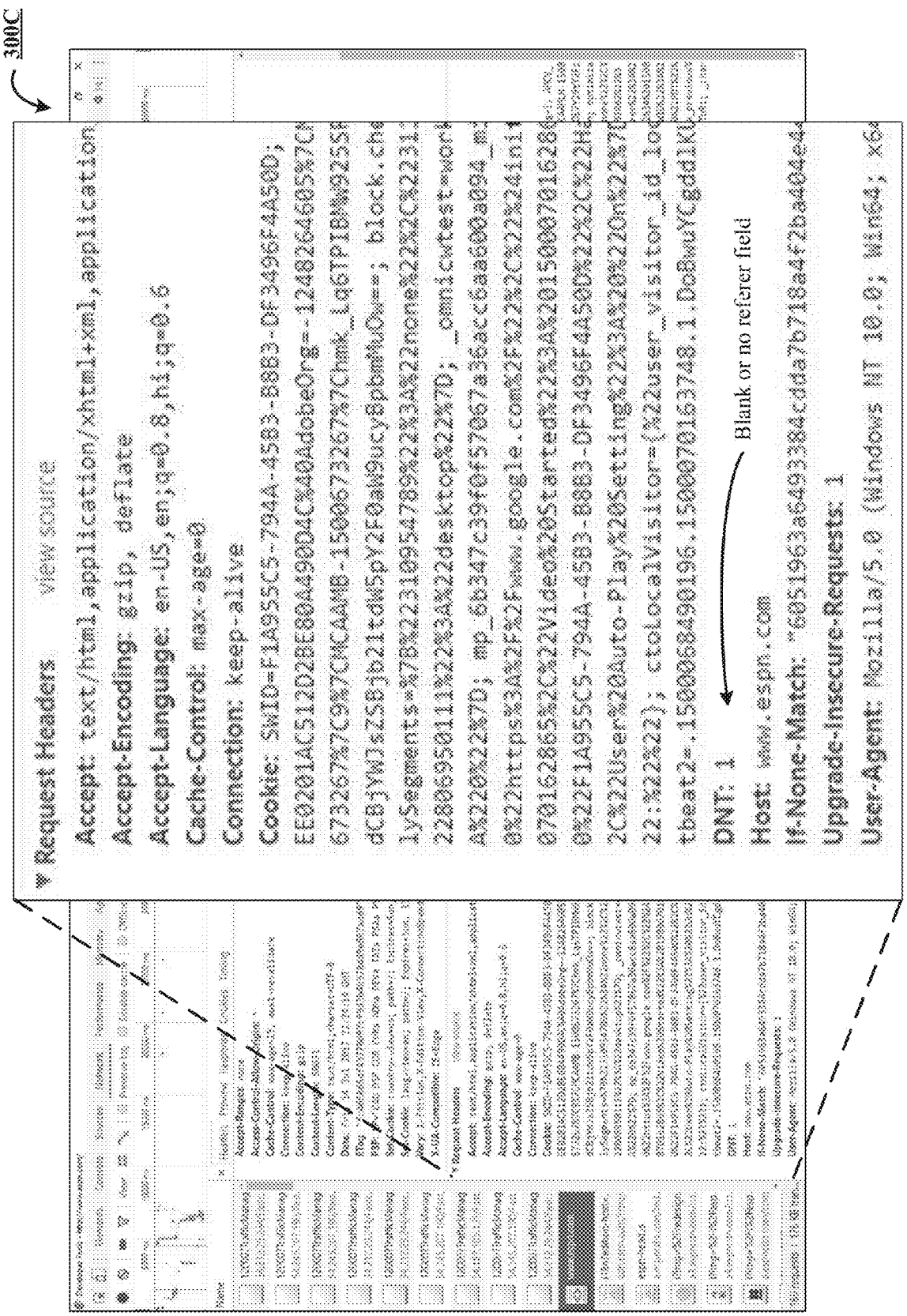
FIG. 3C illustrates an HTTP header of the base web page with a blank or no referrer field.

The technology disclosed uses the HTTP referrer or referrer field to classify URLs as base URLs and subordinate URLs (e.g., child URLs and grandchild URLs). A referrer (http-referrer or referrer) refers to an HTTP header field that identifies the address of the web page (i.e., the universal resource identifier (URI), universal resource link (URL), or internationalized resource identifier (IRI)) that links to a resource being requested. When an HTTP header does not include a referrer field, i.e., the referrer field is NULL or blank, the technology disclosed determines that the HTTP header belongs to a base URL. FIG. 3C illustrates an HTTP header 300C of the base web page 300A with a blank or no referrer field.

When an HTTP header includes a referrer field and the referrer field identifies a base URL, the technology disclosed determines that the HTTP header belongs to a child URL linked to the base URL. The child URL is one of the subordinate URLs for which subordinate HTTP requests for additional resources (e.g., images, scripts, CSS, and Flash) are made when loading the base web page. In some cases, the child URLs are hyperlinks located on the base web page; however subordinate URLs are the more common case.

Figure 4A:
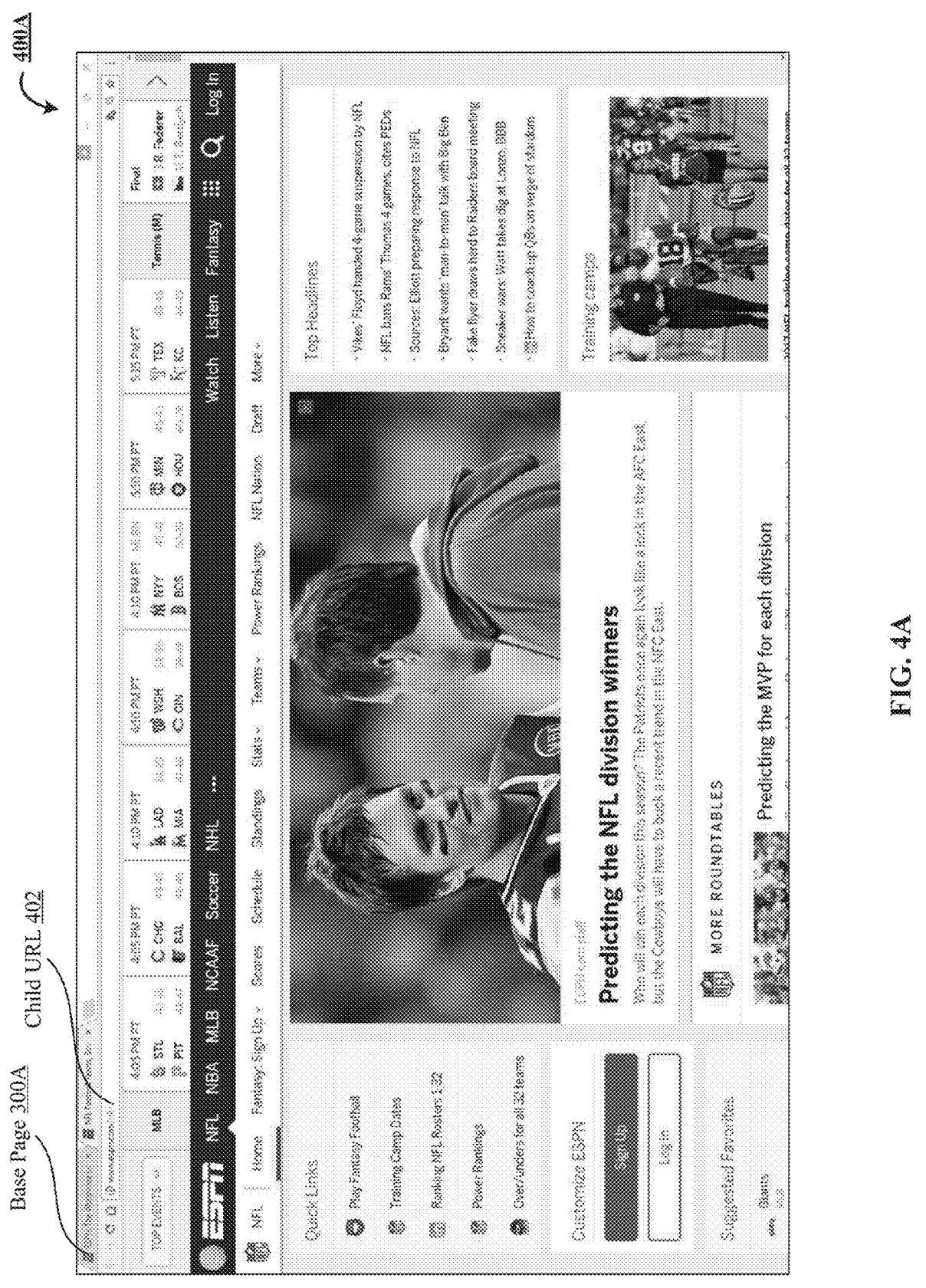
Figure 4B:
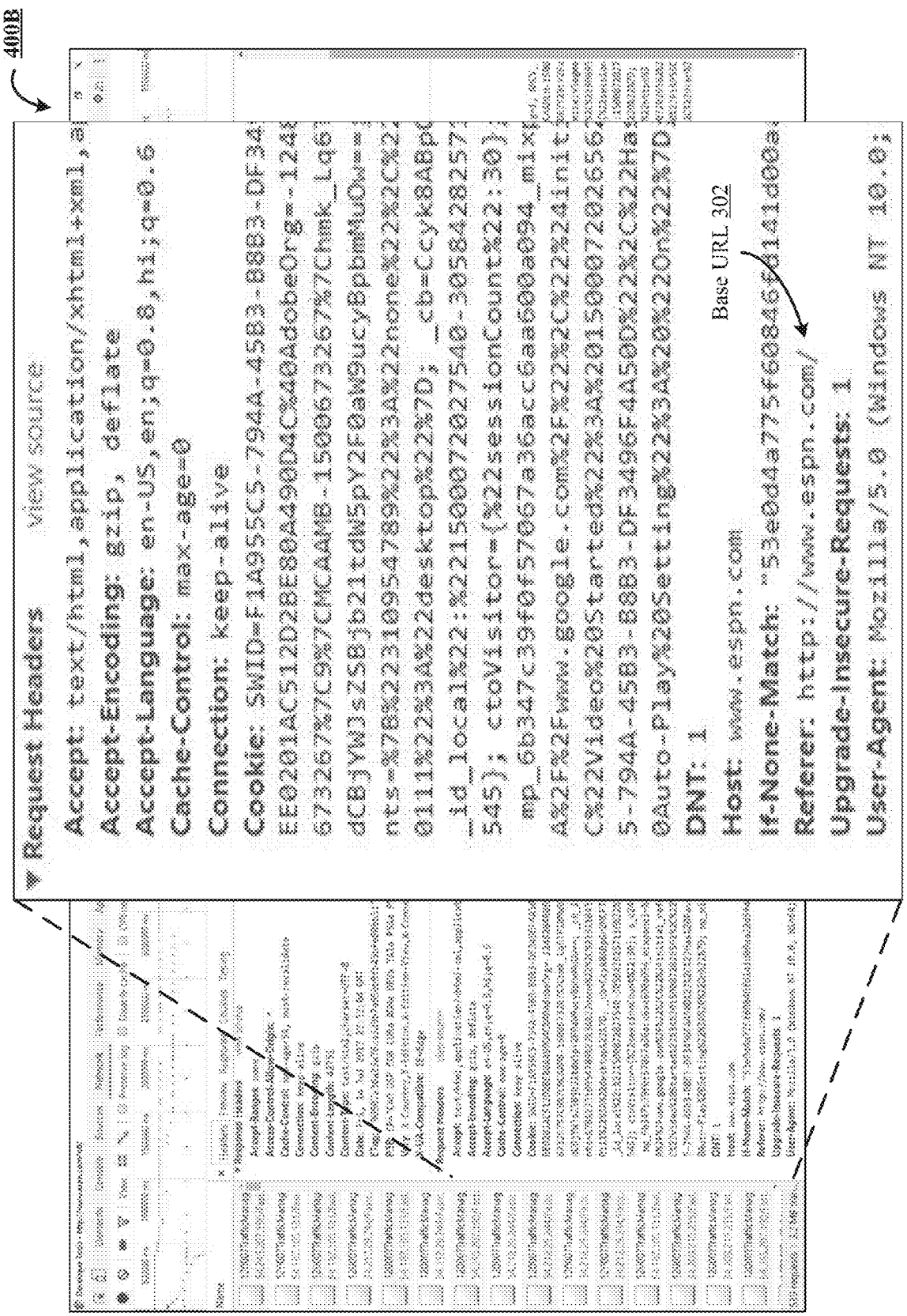
FIG. 4B is an HTTP header of the child web page that specifies the base URL of the base web page in its referrer field.

FIG. 4A shows a child web page 400A loaded for a child URL 402 located on the base web page 300A. FIG. 4B is an HTTP header 400B of the child web page 400A that specifies the base URL 302 "www.espn.com" of the base web page 300A in its referrer field. Based on this specification, the technology disclosed infers that the child web page 400A is referred or referred from the base web page 300A.

When an HTTP header includes a referrer field and the referrer field identifies a child URL, the technology disclosed infers that the HTTP header belongs to a grandchild URL linked to the child URL. The grandchild URL is one of the subordinate URLs for which subordinate HTTP requests for additional resources (e.g., images, scripts, CSS, and Flash) are made when loading the child web page. In some cases, the grandchild URLs are hyperlinks located on the child web page; however subordinate URLs are the more common case.

Figure 5A:
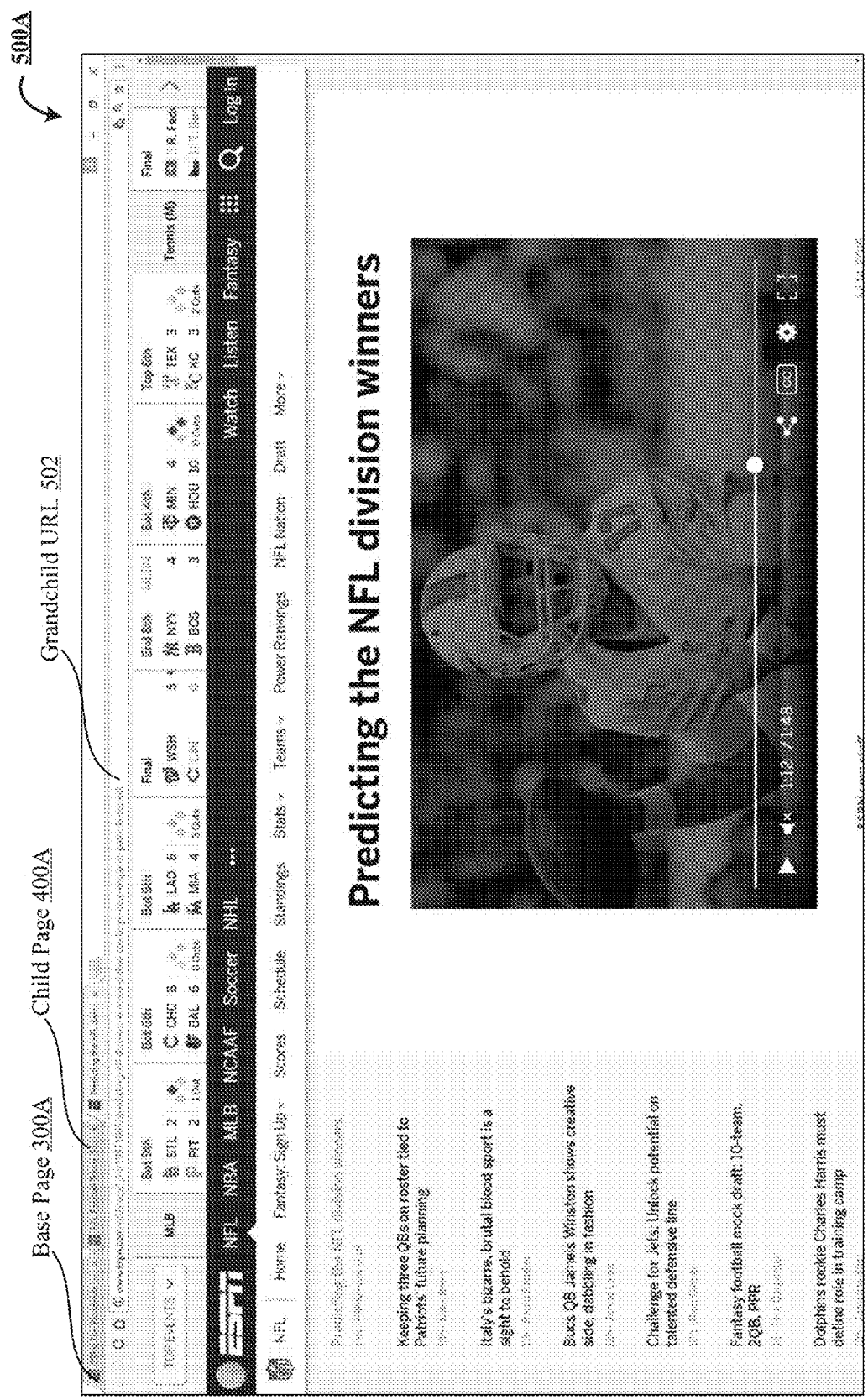
FIG. 5A illustrates a grandchild web page loaded for a grandchild URL located on the child web page.
Figure 5B:
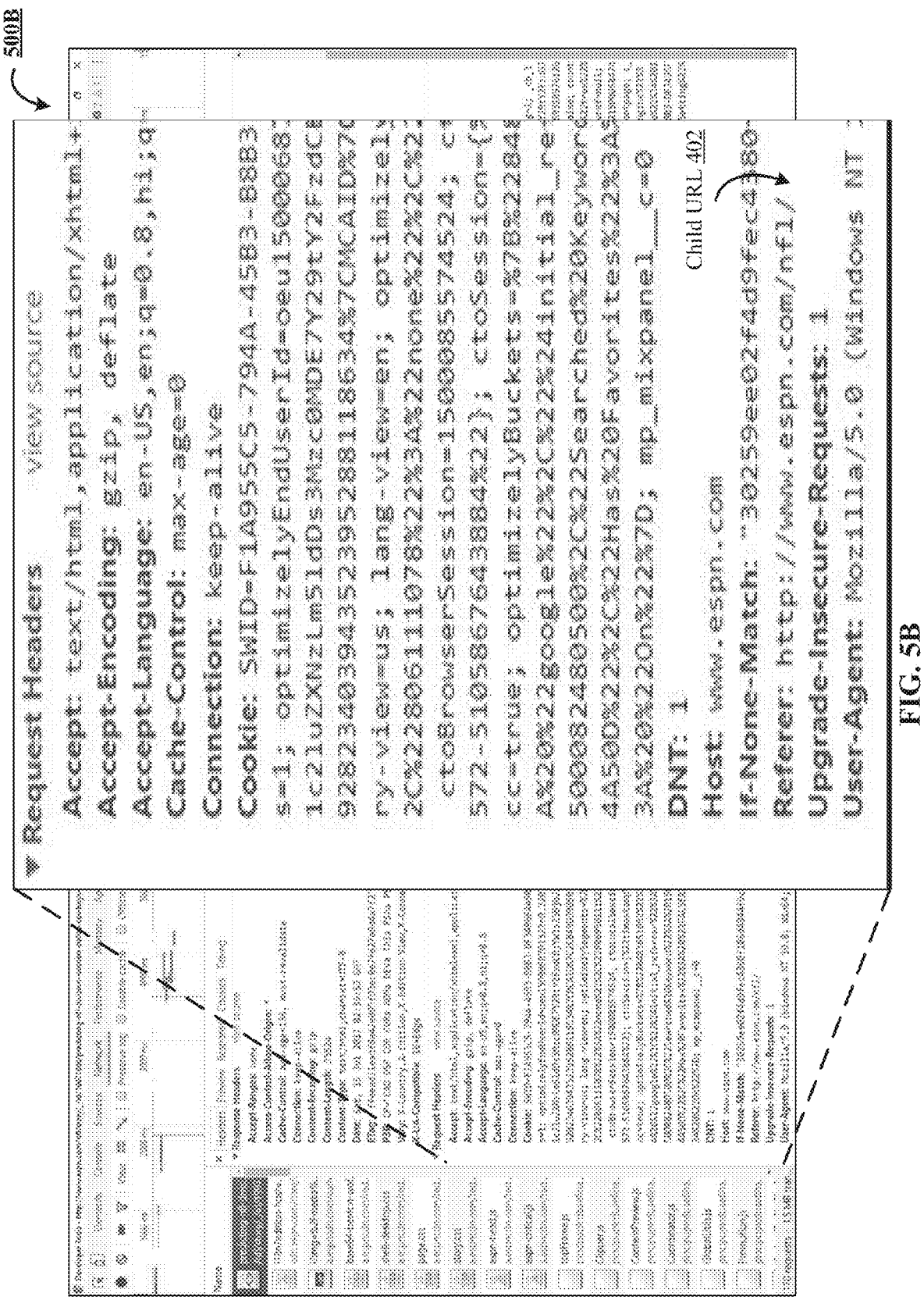
FIG. 5B depicts an HTTP header of the grandchild web page that specifies the child URL of the child web page in its referrer field.

FIG. 5A illustrates a grandchild web page 500A loaded for a grandchild URL 502 located on the child web page 400A. FIG. 5B depicts an HTTP header 500B of the grandchild web page 500A that specifies the child URL 402 of the child web page 400A in its referrer field. Based on this specification, the technology disclosed infers that the grandchild web page 500A is referred from the child web page 400A.

Compact Logging

Having described classification of base and subordinate URLs based on the HTTP referrer field, the discussion now turns to how the subordinate URLs are compactly logged under the base URL. FIG. 5C shows how the HTTP referrer field is used to compactly log child and grandchild URLs under the base URL. Table 500C shows four HTTP requests. The first request is for "https://www.box.com" and has a NULL referrer field. As a result, the first request is classified as the base URL. The second request is for "https://app.box-.com" and has the base URL in its referrer field. As a result, the second request is classified as the child URL referred from the base URL. The third request is for "https://newdomain.com" and has the child URL in its referrer field. As a result, the third request is classified as the grandchild URL referred from the child URL. The fourth request is for "https://test.com" and has the grandchild URL in its referrer field. As a result, the fourth request is classified as the great grandchild URL referred from the grandchild URL.

Compactly logging the four HTTP requests includes logging the child, grandchild, and great grandchild URLs under the corresponding base URL, as opposed to individually logging them. In one implementation, a single page event is logged for the four HTTP requests and the base page URL "https://www.box.com" is assigned to the page event.

The subordinate URLs are summarized. One example of summarization is counting the subordinate URLs and assigning the count to the corresponding base URL. Another example of summarization is logging the subordinate URLs in much less detail compared to the corresponding base URL. Yet another example of summarization is compressing the logs of the subordinate URLs.

Policy-Based Logging

In addition to selectively logging only the base URLs, the technology disclosed also logs URLs that violate an established policy. For instance, if a data loss prevention (DLP) policy calls for logging URLs of transactions that involve sensitive data, then such URLs, despite being subordinate URLs, are logged along with the corresponding base URLs. In another example, a subordinate URL that is identified as a malicious URL based on reference to a black list of malicious URLs is also logged in addition to the corresponding base URL. In yet another example, if a bandwidth monitoring policy calls for logging URLs of transactions that involve streaming media, then such URLs, despite being subordinate URLs, are logged along with the corresponding base URLs.

Figure 6:
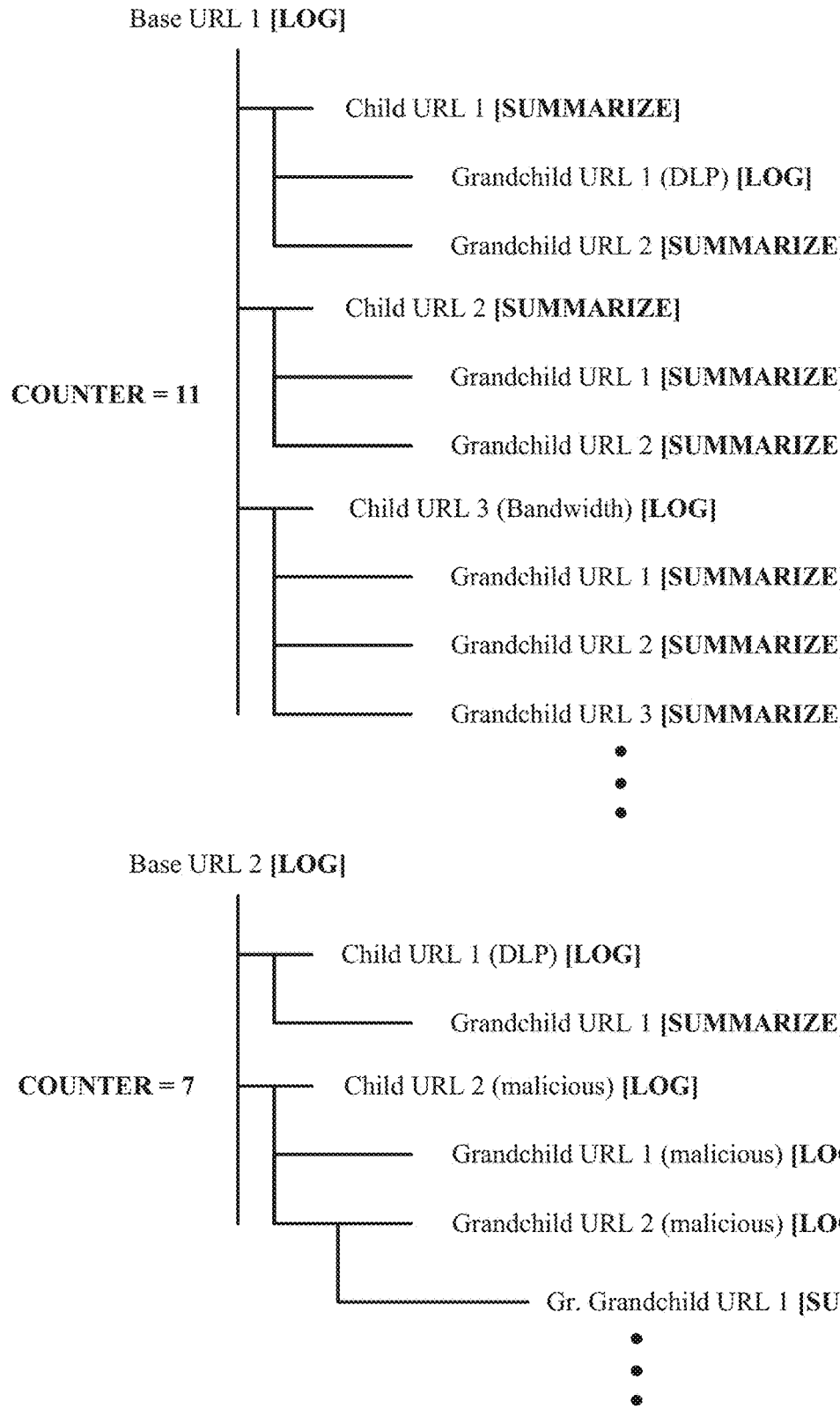
FIG. 6 shows policy-based logging of base URLs and certain subordinate URLs.

FIG. 6 shows policy-based logging 600 of base URLs and certain subordinate URLs. The first hierarchy has eleven HTTP requests, of which only three are logged—the base URL, the DLP-related grandchild URL, and the bandwidth-related child URL. Remaining subordinate URLs are summarized by the counter as instances of HTTP requests or transactions initiated by the corresponding base URL. The second hierarchy has seven HTTP requests, of which only five are logged—the base URL and the four malicious subordinate URLs. Remaining subordinate URLs are summarized by the counter.

Management Interfaces

Having described the algorithms used for compact logging of network traffic events, the discussion now turns to examples management interfaces that graphically depict the logged events and alerts and summarized subordinate HTTP transactions. Example management interfaces 700A, 700B, and 700C are generated by the management plane 212.

FIG. 7A illustrates example management interface 700A with base URLs logged as events. In the example shown in FIG. 7A, eight out of the 31,411 logged events are shown. Macro metadata information about the base URLs is logged under attributes like "time", "user location", "user", "site", "category", and "total bytes". Examples of macro metadata values are shown in interface 700A.

Figure 7B:
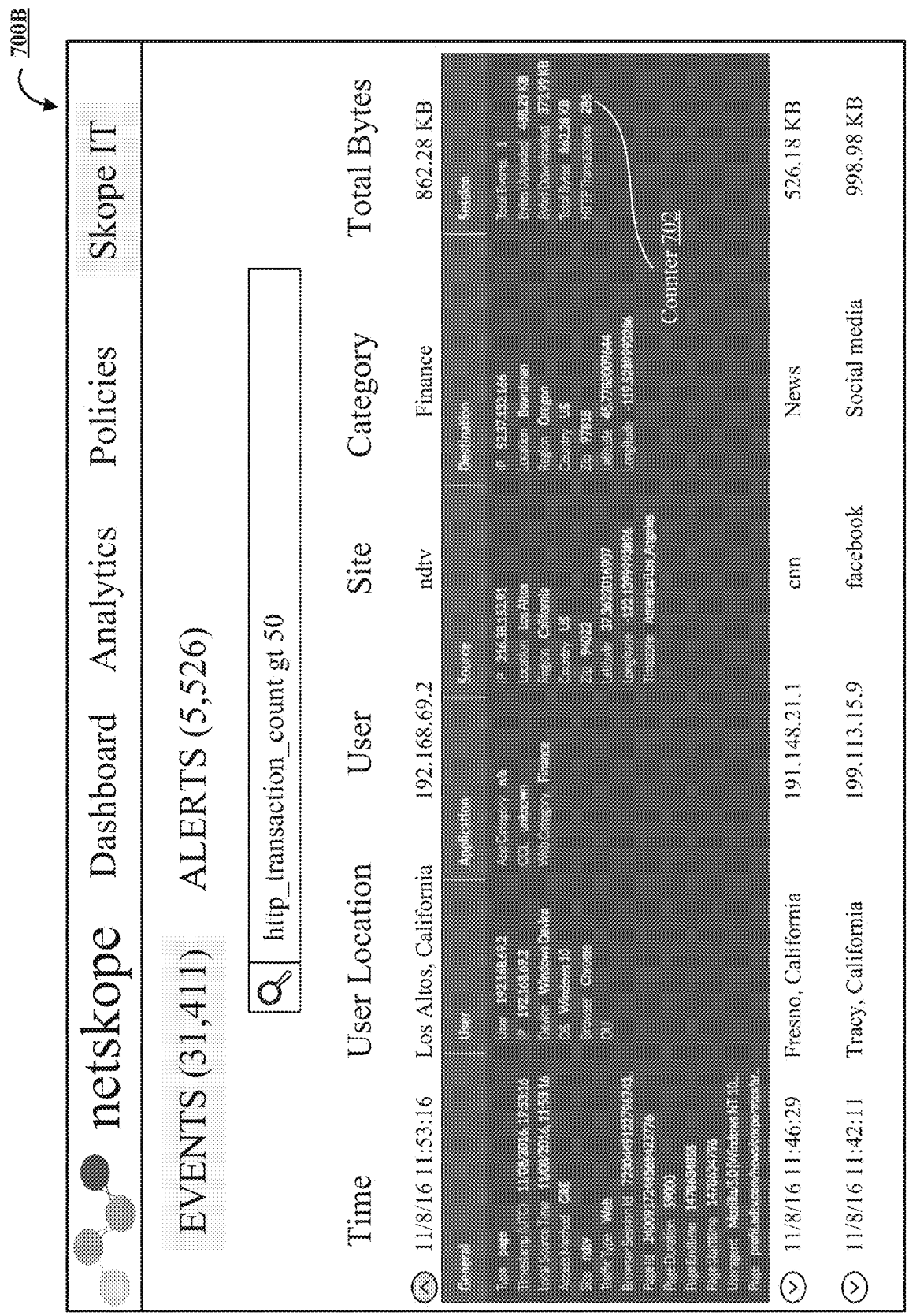
FIG. 7B shows an example detailed view of an event logged for a base URL, with a counter for subordinate HTTP requests referred or "referred" from the base URL.

FIG. 7B shows an example detailed view 700B of an event logged for a base URL, with a counter 702 that summarizes subordinate HTTP requests referred from the base URL. In the example shown in FIG. 7B, an event logged for the base URL "profit.ndtv.com/news/corporates/ar . . . " has 286 subordinate HTTP transactions. Micro metadata information about the base URL is logged under attributes like "general", "user", "application", "source", "destination", and "session". Micro metadata can be viewed by the administrator by selecting a show more-style button. Examples of micro metadata values are shown in interface 700B.

Figure 7C:
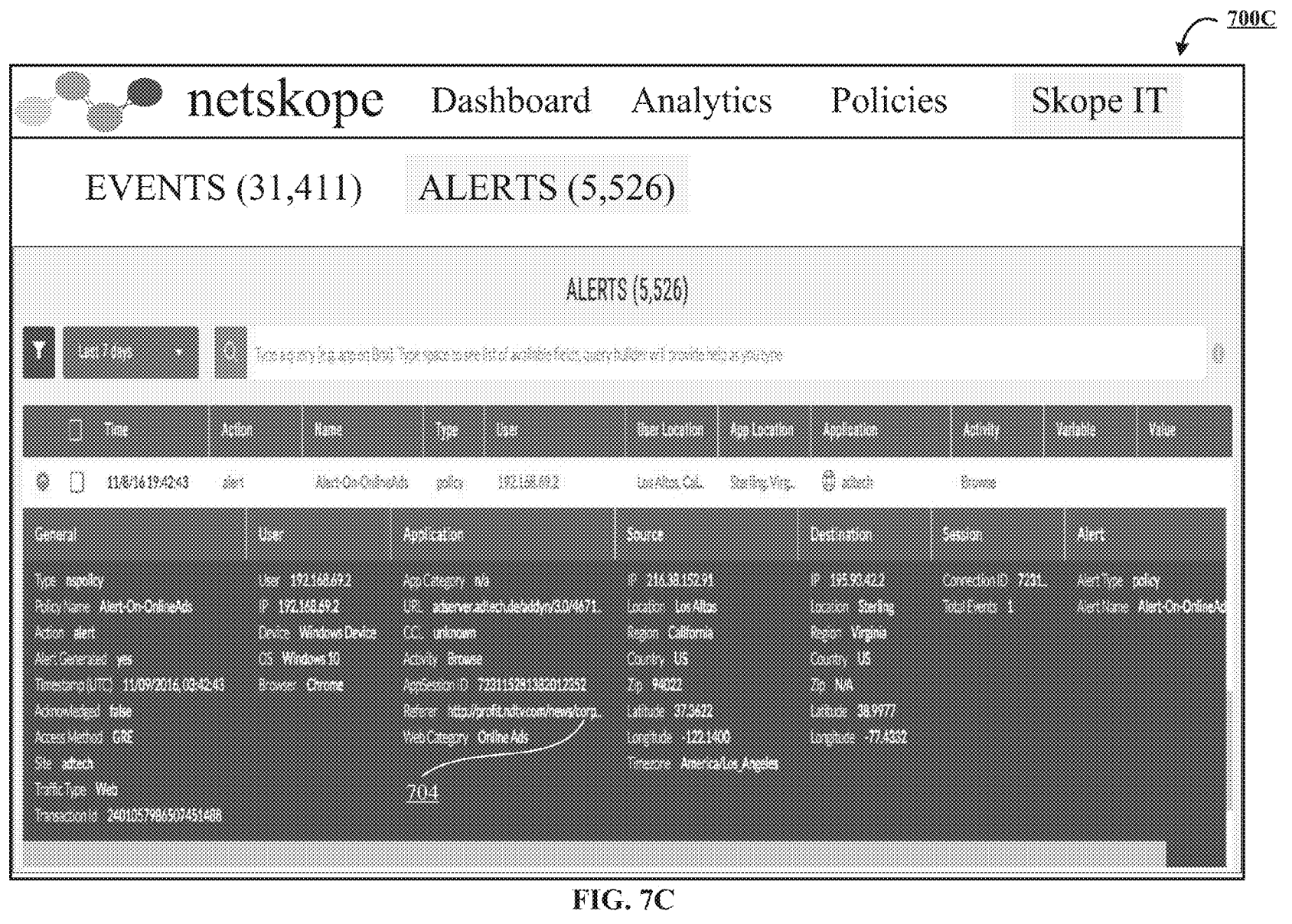

FIG. 7C depicts a management interface 700C with base and subordinate URLs logged as alerts in accordance with a policy. The alerts are typically triggered when a policy is violated. In the example shown in FIG. 7C, just one out of the 5,526 alerts is shown. The alert corresponds to a subordinate URL because its referrer field 704 is not blank and identifies another URL. Macro metadata information about the alert is logged under attributes like "time", "action", "name", "type", "user", "user location", "app location", "application", "activity", "variable", and "value". Examples of macro metadata values are shown in interface 700C. Micro metadata information about the alert is also logged under attributes like "general", "user", "application", "source", "destination", "session, and "alert". Micro metadata can be viewed by the administrator by selecting a show more-style button. Examples of micro metadata values are also shown in interface 700C.

Data Structures

Figure 8:
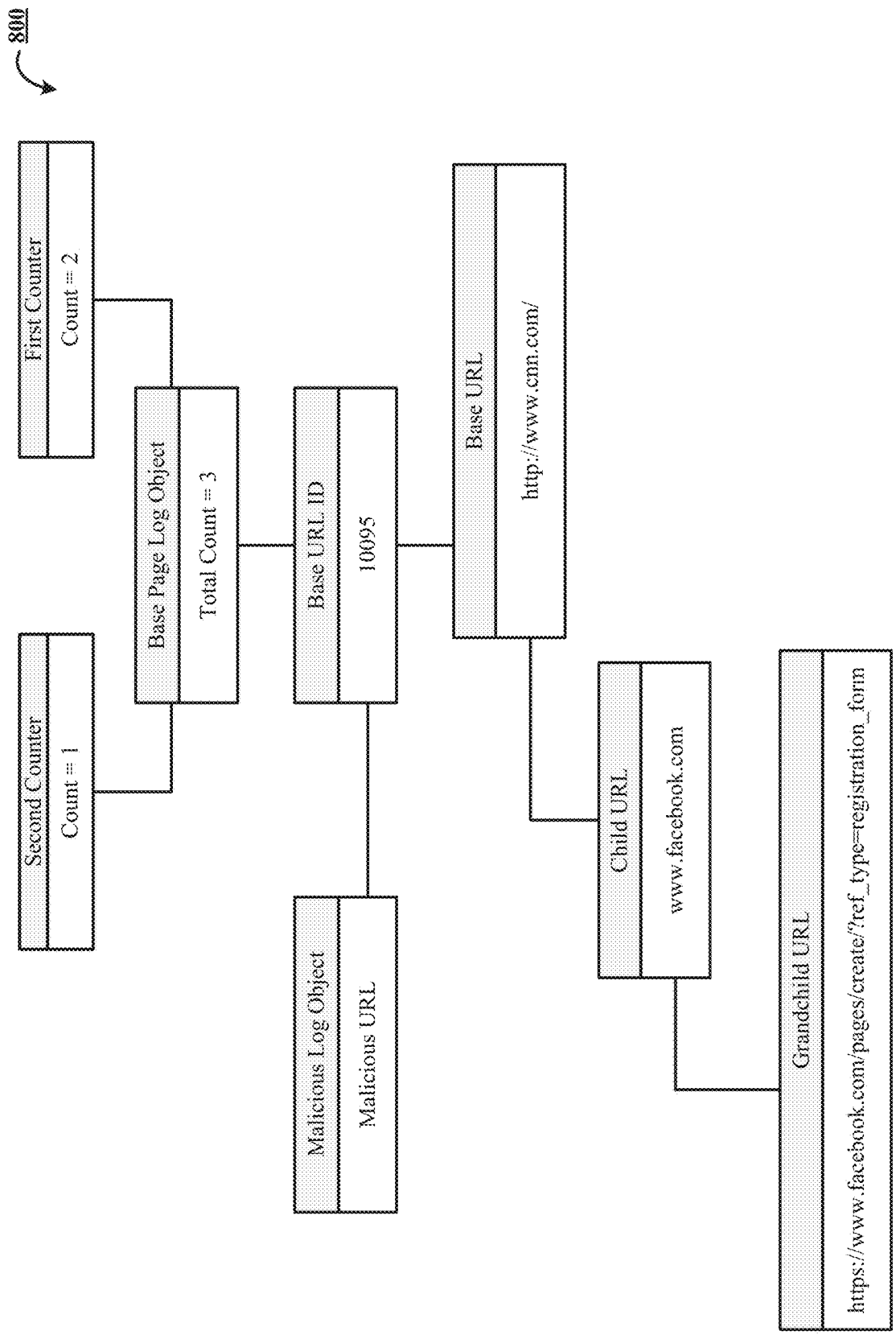
FIG. 8 shows examples of log objects and other data structures used by the technology disclosed.

Having described some example management interfaces used to depict logged events and alerts and summarized subordinate HTTP transactions, the discussion now turns to some of the data structures 800 used by the technology disclosed. FIG. 8 shows examples of two log objects-base page log object and malicious log object. Base page log object is initialized when an HTTP request is identified as a base URL (e.g., http://www.cnn.com/). The base page log object is linked to the base URL using a unique base URL ID (e.g., 10095). The base page log object maintains various counters for the corresponding base page. The counters maintain a count of the number of HTTP subordinate requests emanated from the base page. In some implementations, different counters are initialized for each hierarchy level such as child URLs, grandchild URLs, and great grandchild URLs. In other implementations, a total count for all subordinate URLs of the base URL is maintained at the base page log object. The counters are responsive to TCP start and end connection events.

In some implementations, the subordinate URLs are also linked to the corresponding base URL in accordance with the hierarchy. For example, as shown in FIG. 8, the child URL "www.facebook.com" is linked to the base URL "http://www.cnn.com/" and the grandchild URL "https://www.facebook.com/pages/create/?ref_type=registration_form" is linked to the child URL.

The malicious log object is used to specially log malicious URLs emanating from the base URL. The malicious log object is linked to the base URL using the unique base URL ID.

Message Sequence Diagrams

Having described some of the data structures used by the technology disclosed, the discussion now turns to message sequence diagrams of FIGS. 9-13 which illustrate various aspects of the technology disclosed. In the message sequence diagrams shown in FIGS. 9-13, multiple exchanges can be combined in some implementations. Other implementations may perform the exchanges in different orders and/or with different, fewer or additional exchanges than the ones illustrated in FIGS. 9-13. For convenience, the diagrams are described with reference to the systems that carry out the methods. The systems are not necessarily part of the methods.

Figure 9:
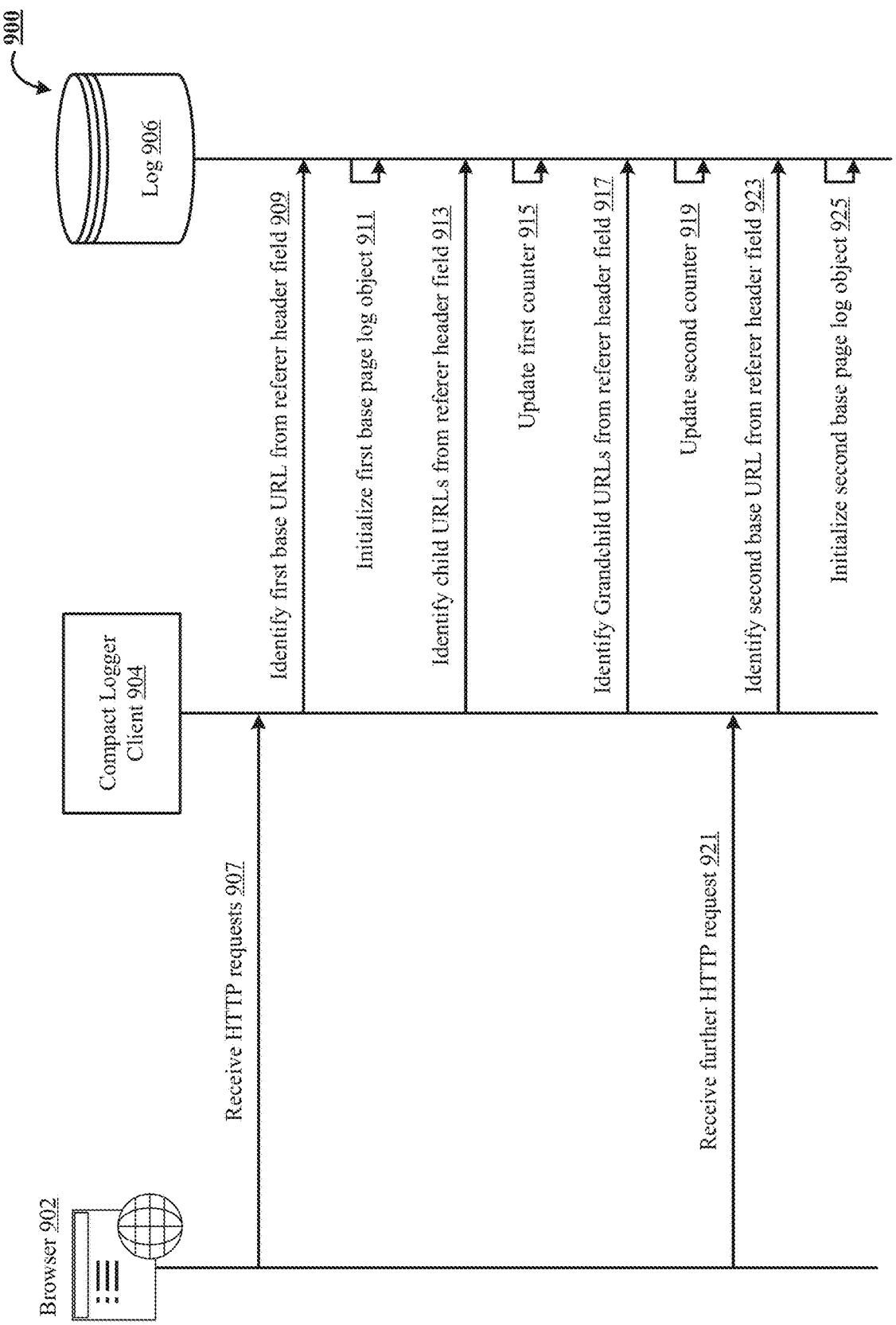
FIG. 9 illustrates a message sequence diagram of compact logging of network traffic events.

FIG. 9 illustrates a message sequence diagram 900 of compact logging of network traffic events. At message 907, the compact logger client 904 receives a plurality of HTTP requests produced during processing of a first base page by the browser 902. The HTTP requests include a first base URL, child URLs, and grandchild URLs.

At message 909, the compact logger client 904 identifies at least one HTTP request with a blank or no referrer header field as referring or referring to a first base URL. In response, at message 911, a first base page log object is initialized at the log database 906.

At message 913, based on specification of the first base URL in respective referrer header fields, the compact logger client 904 identifies some of the HTTP requests as referred from the first base URL and counts the identified HTTP requests as child URLs. In response, at message 915, a first counter of the first base page log object is updated at the log database 906.

At message 917, based on specification of the child URLs in respective referrer header fields, the compact logger client 904 further identifies some of the HTTP requests as referred from the child URLs and counts the identified HTTP requests as grandchild URLs. In response, at message 919, a second counter of the first base page log object is updated at the log database 906.

At message 923, the compact logger client 904 identifies a further HTTP request received at message 921 with a blank or no referrer header field as referring to a second base URL of a second base page. In response, at message 925, a second base page log object is initialized at the log database 906.

Figure 10:
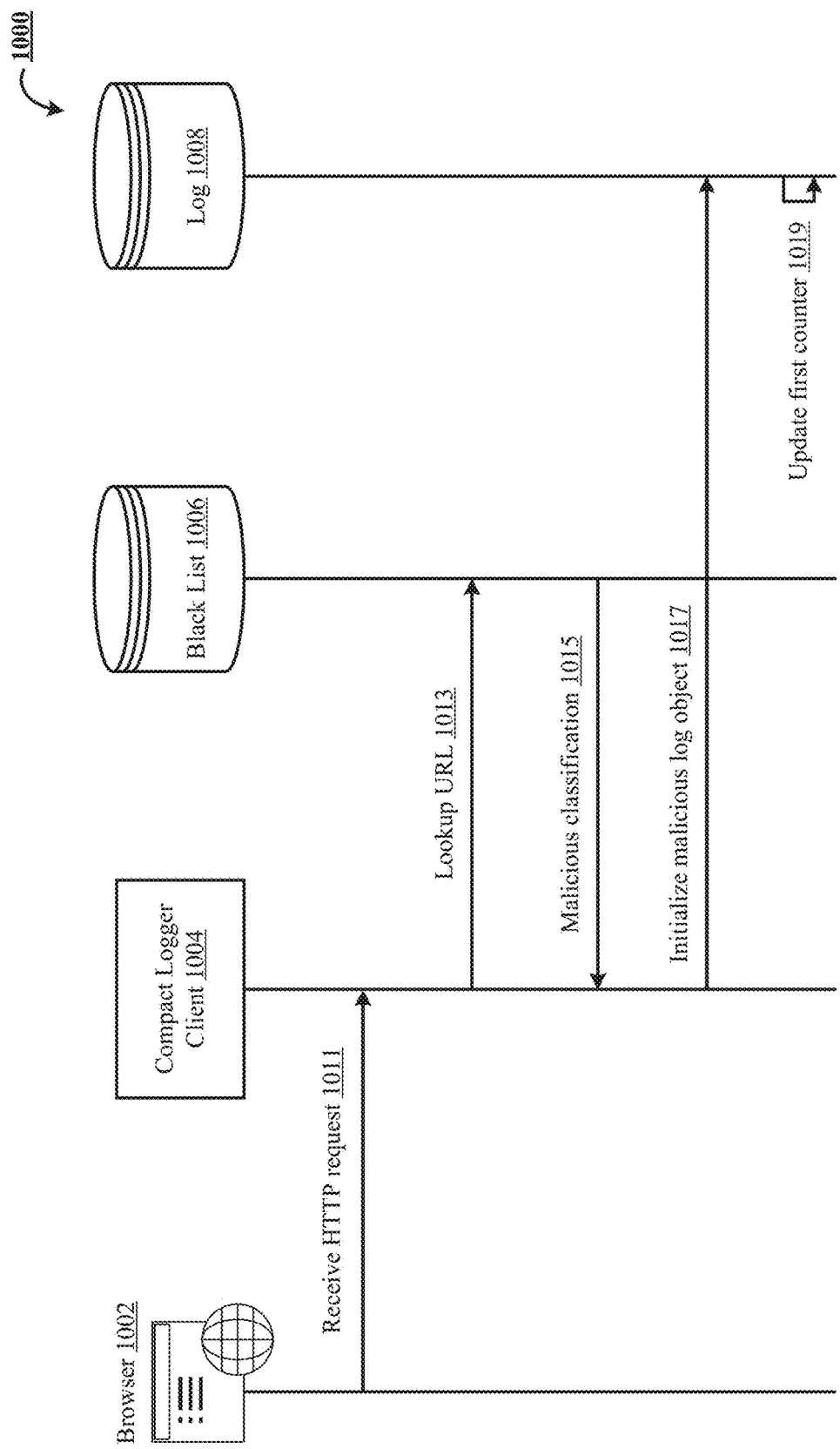
FIG. 10 is a message sequence diagram of specially logging a malicious URL.

FIG. 10 is a message sequence diagram 1000 of specially logging a malicious URL. At message 1011, the compact logger client 1004 receives an HTTP request produced during processing of a base page by the browser 1002.

At message 1013, the compact logger client 1004 looks up a URL included in the HTTP request in the black list 1006 to determine whether the URL is malicious. Black list 1006 is a database that maintains a list of malicious URLs. In response, at message 1015, the compact logger client 1004 receives a malicious classification of the URL.

At message 1017, the compact logger client 1004 initializes a malicious log object at the log database 1008. At message 1019, a first counter of the malicious log object is updated at the log database 1008 and a summary of the malicious log object is reported out for use in a further process.

In scenarios where the compact logger client 1004 receives a non-malicious classification of the URL, a base page log object is initialized or updated at the log database 1008, instead of a malicious log object being initialized or updated.

Figure 11:
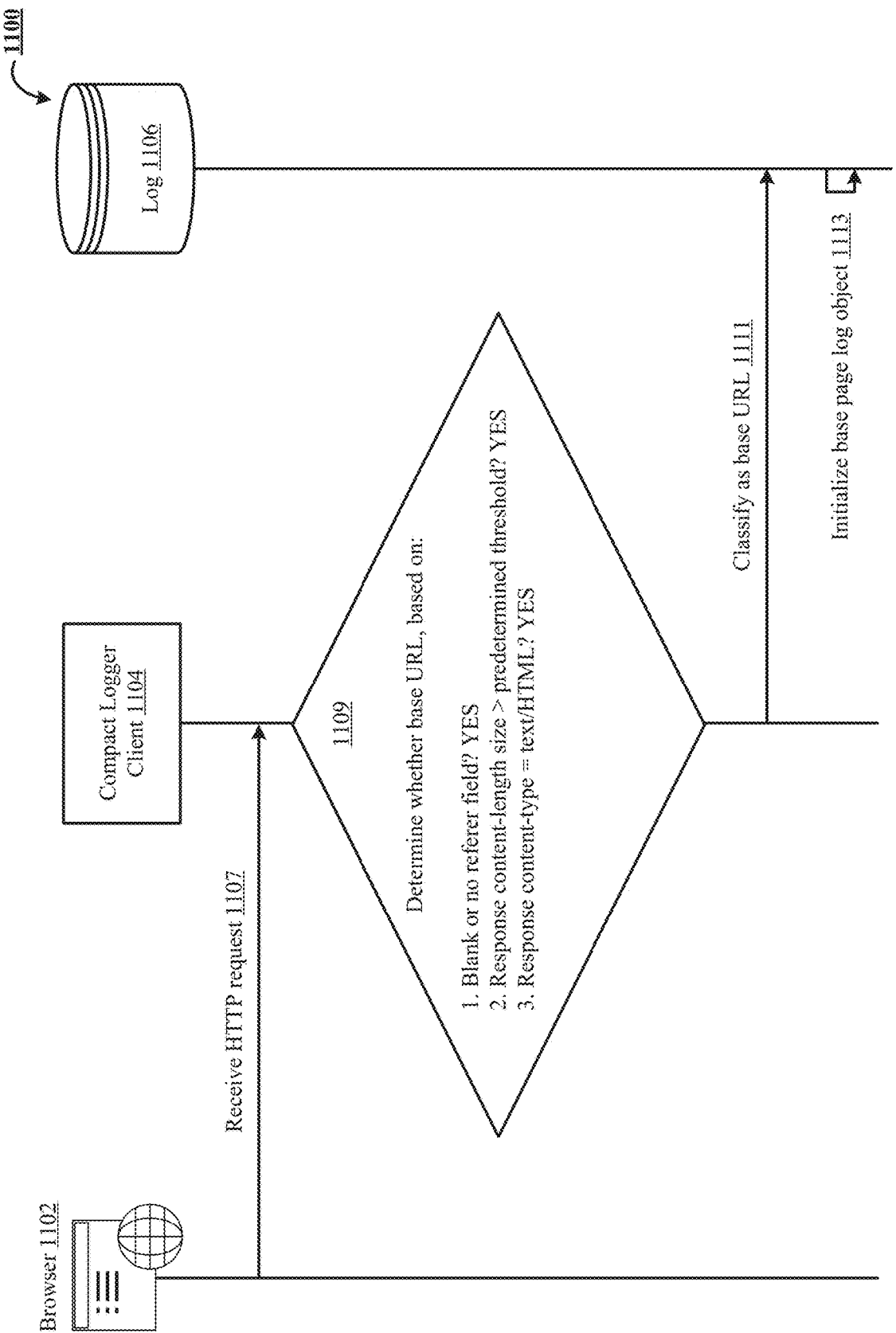
FIG. 11 shows a message sequence diagram of using a heuristics-based approach to classify an HTTP request as a base URL.

FIG. 11 shows a message sequence diagram 1100 of using a heuristics-based approach to accurately classify an HTTP request as a base URL. Certain subordinate URL requests (e.g., for resources like cascading style sheets (CSS)) can disguise as base URLs by having a NULL or blank referrer field. To prevent misclassification of such subordinate URLs as base URLs, the technology disclosed uses a heuristics-based approach, as described below.

At message 1107, the compact logger client 1104 receives an HTTP request produced during processing of a base page by the browser 1102.

At message 1109, the compact logger client 1104 determines whether a URL included in the HTTP request is a base URL. The determination is made using the following heuristics—(1) whether a blank or no referrer header field exists in the HTTP request, (2) whether a content-length size of the corresponding HTTP response is above a predetermined threshold (e.g., 35000 bytes), and (3) whether a content-type of the HTTP response is text/HTML.

In other implementations, the determination is made using the following heuristics—(1) whether a blank or no referrer header field exists in the HTTP request and (2) whether a content-type of the HTTP response is text/HTML. In the illustrated implementation, all three heuristics are met. In other implementations, only a subset of the heuristics may be met for a "base URL" classification.

At message 1111, the compact logger client 1104 classifies the URL as a base URL. In response, at message 1113, a base page log object is initialized at the log database 1106.

Figure 12:
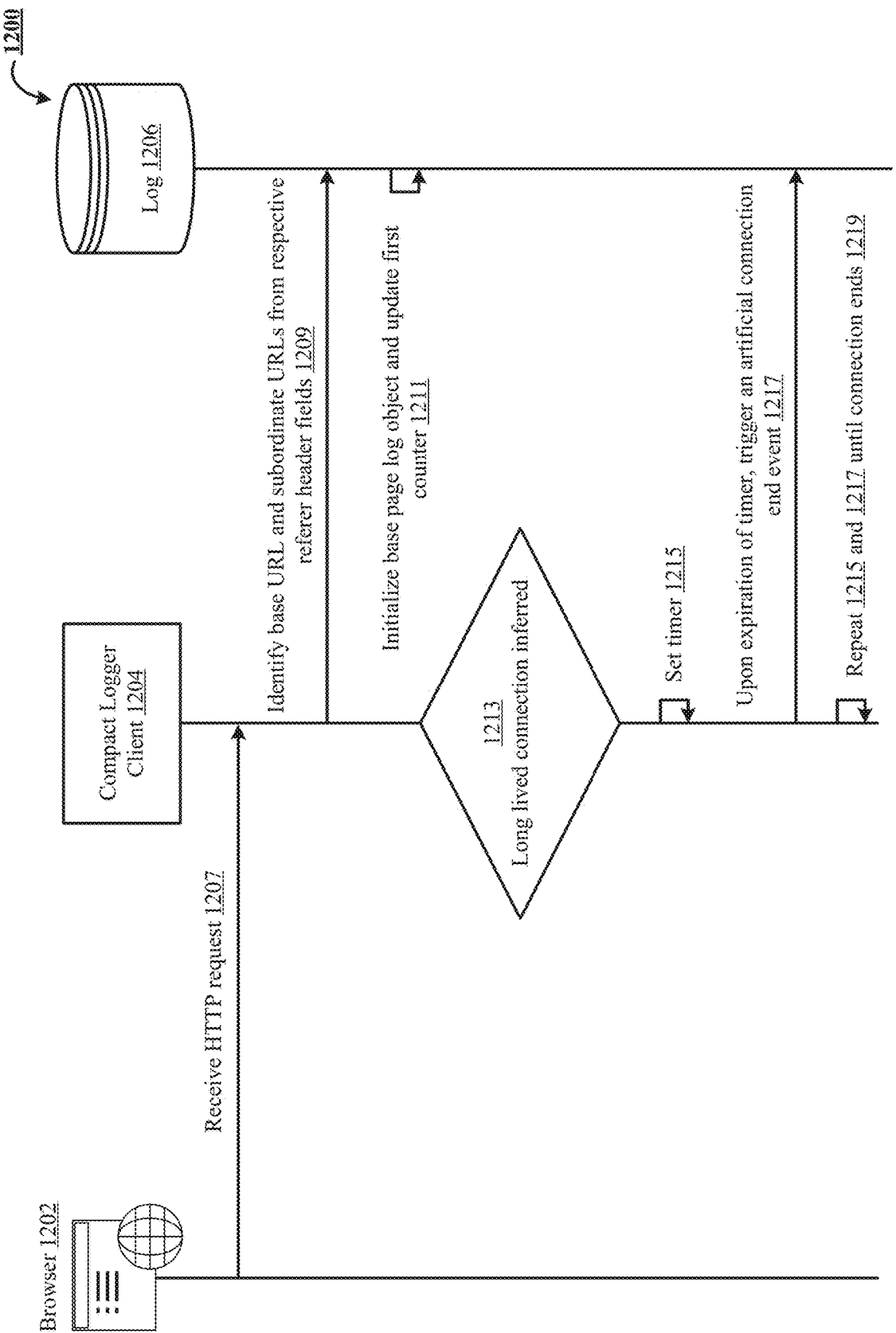
FIG. 12 depicts a message sequence diagram of using a timer to compactly log network traffic events for persistent TCP connections.

FIG. 12 depicts a message sequence diagram 1200 of using a timer to compactly log network traffic events for persistent TCP connections. At message 1207, the compact logger client 1204 receives an HTTP request produced during processing of a base page by the browser 1202. In response, at message 1209, the compact logger client 1204 identifies a base URL and corresponding subordinate URLs from respective referrer header fields.

At message 1211, the compact logger client 1204 initializes a base page log object for the HTTP request at the log database 1206 and updates a first counter of the base page log object based on counting the subordinate URLs.

At message 1213, the compact logger client 1204 determines or infers that the HTTP request establishes a long lived connection. In one implementation, a long lived connection is detected by monitoring a TCP connection and determining that the TCP connection has persisted for longer than a predetermined time period (e.g., 1 min, 5 mins, 15 mins, 20 mins).

In response, at message 1215, the compact logger client 1204 sets a timer on the long lived connection. The timer can be of any predetermined temporal threshold (e.g., 15 mins, 25 mins, 30 mins). In some implementations, the timer is initialized when an HTTP request is received by the compact logger client 1204 to determine whether the HTTP request is a long lived connection.

At message 1217, upon expiration of the timer, the compact logger client 1204 triggers an artificial connection end event, closes out counting of the subordinate URLs, persists the base page log object and the first counter, and starts a further counter for the base page.

At message 1219, the compact logger client 1204 restarts the timer and iterates over messages 1215 and 1217 until the long lived connection ends. End of the long lived connection is inferred when the compact logger client 1204 receives an authentic connection end event.

Accordingly, a count of the subordinate URLs is initialized when the timer starts and terminated when the timer expires. Consider a long lived connection for which the timer is started and expired multiple times. For such a long lived connection, the counting of subordinate URLs is also initialized and terminated multiple times. As a result, subordinate URLs identified during the life of the long lived connection are bucketed into temporal windows, with each window having the same length as the predetermined temporal threshold of the timer.

Figure 13:
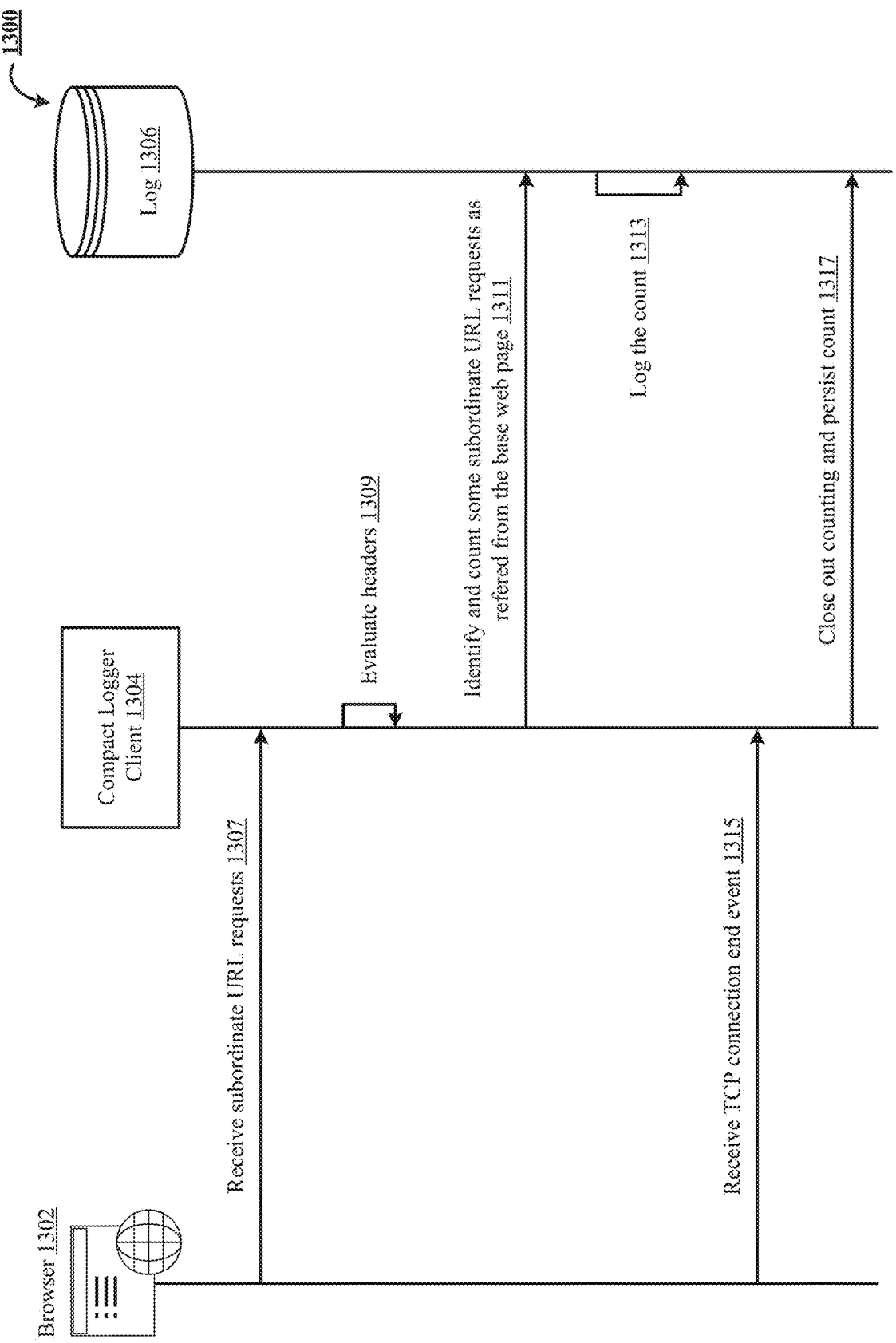
FIG. 13 illustrates a message sequence diagram of logging subordinate URL requests referred from the base web page.

FIG. 13 illustrates a message sequence diagram 1300 of logging subordinate URL requests referred from the base web page. At message 1307, the compact logger client 1304 receives a plurality of subordinate URL requests produced during loading a base web page by the browser 1302.

At message 1309, the compact logger client 1304 evaluates headers of the subordinate URL requests.

Based on the evaluation, at message 1311, the compact logger client 1304 identifies some of the subordinate URL requests as referred from the base web page, based on specification of a URL of the base web page in respective referrer header fields of the subordinate URL requests.

At message 1313, logging of the identified subordinate URL requests is handled by counting the identified subordinate URL requests and logging the count in a log entry for the base web page at the log database 1306.

At message 1315, the compact logger client 1304 receives a TCP connection end event corresponding to the base web page. In response, at message 1317, the compact logger client 1304 closes out counting of the identified subordinate URL requests for the base web page and persists the log entry for the base web page and at least one counter at the log database 1306.

Computer System

Figure 14:
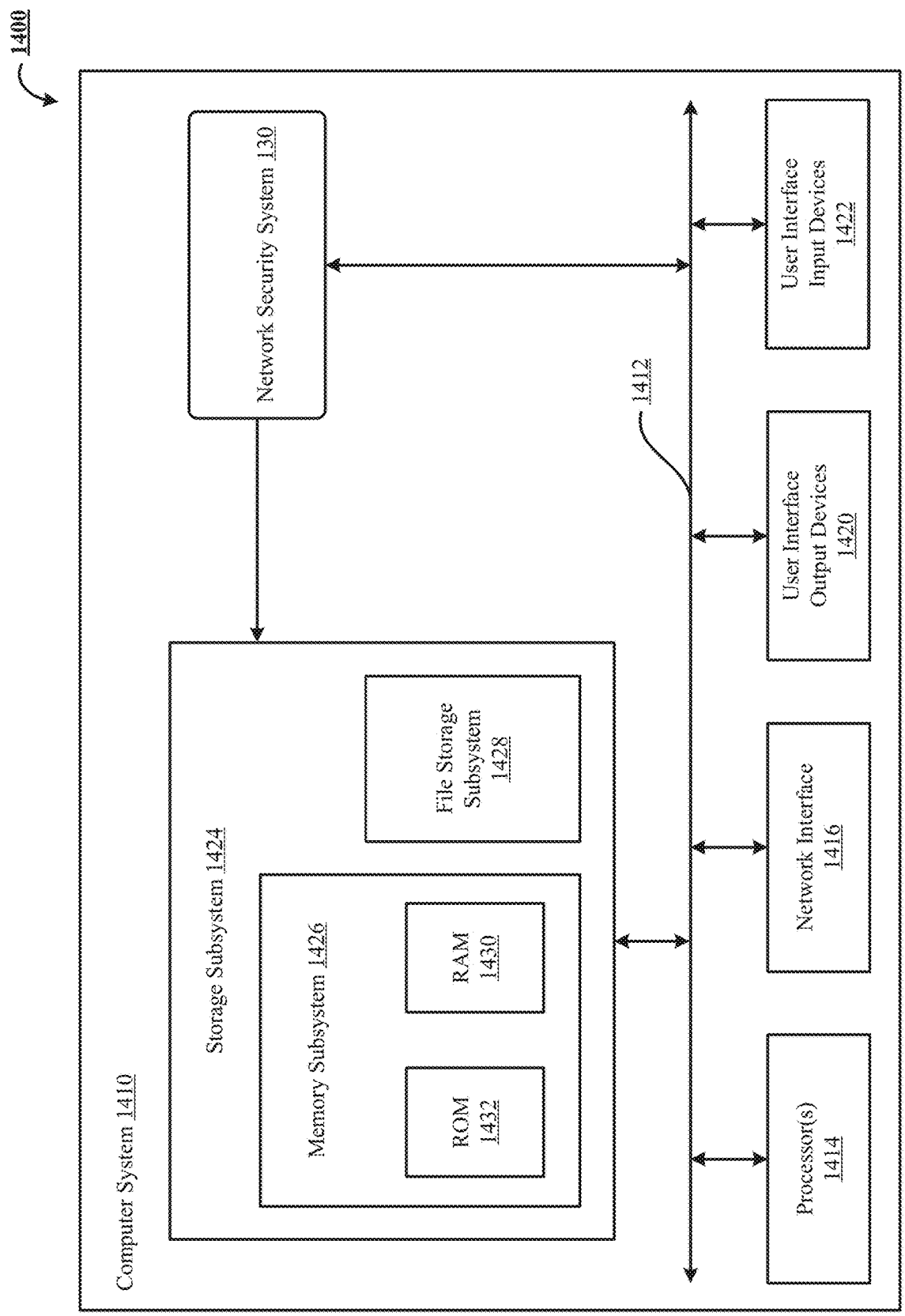
FIG. 14 is a simplified block diagram of a computer system that can be used to implement the network security system.

FIG. 14 is a simplified block diagram 1400 of a computer system 1410 that can be used to implement the network security system 130. Computer system 1410 typically includes at least one processor 1414 that communicates with a number of peripheral devices via bus subsystem 1412. These peripheral devices can include a storage subsystem 1424 including, for example, memory devices and a file storage subsystem, user interface input devices 1422, user interface output devices 1420, and a network interface subsystem 1416. The input and output devices allow user interaction with computer system 1410. Network interface subsystem 1416 provides an interface to outside networks, including an interface to corresponding interface devices in other computer systems.

User interface input devices 1422 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1410.

User interface output devices 1420 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1410 to the user or to another machine or computer system.

Storage subsystem 1424 stores programming and data constructs that provide the functionality of some or all of the modules and methods described herein. These software modules are generally executed by processor 1414 alone or in combination with other processors.

Memory 1426 used in the storage subsystem can include a number of memories including a main random access memory (RAM) 1430 for storage of instructions and data during program execution and a read only memory (ROM) 1432 in which fixed instructions are stored. A file storage subsystem 1428 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1428 in the storage subsystem 1424, or in other machines accessible by the processor.

Bus subsystem 1412 provides a mechanism for letting the various components and subsystems of computer system 1410 communicate with each other as intended. Although bus subsystem 1412 is shown schematically as a single bus, alternative implementations of the bus subsystem can use multiple busses.

Computer system 1410 can be of varying types including a workstation, server, computing cluster, blade server, server farm, or any other data processing system or computing device. Due to the ever-changing nature of computers and networks, the description of computer system 1410 depicted in FIG. 14 is intended only as one example. Many other configurations of computer system 1410 are possible having more or fewer components than the computer system depicted in FIG. 14.

Particular Implementations

We describe systems, methods, and articles of manufacture for compact logging of network traffic events. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A system implementation of the technology disclosed includes one or more processors coupled to the memory. The memory is loaded with computer instructions to compactly log network traffic events. The system includes a compact logger client running on a device that receives a plurality of hypertext transfer protocol (HTTP) requests produced during processing of a base page. The HTTP requests include a base unified resource locator (URL), child URLs, and grandchild URLs.

The system identifies at least one HTTP request with a blank or no referrer header field as referring to the base URL. The system then initializes a first base page log object.

Based on specification of the base URL in respective referrer header fields, the system also identifies some of the HTTP requests as referred from the base URL. The system then—(1) counts the identified HTTP requests as child URLs and (2) updates a first counter of the first base page log object.

Based on specification of one of the child URLs in respective referrer header fields, the system further identifies some of the HTTP requests as referred from the child URLs. The system then—(1) counts the identified HTTP requests as grandchild URLs and (2) updates a second counter of the first base page log object.

The system identifies a further HTTP request with a blank or no referrer header field as referring to a second base URL of a second base page. The system then—(1) reports out for use in a further process a summary of the first base page log object and (2) initializes a second base page log object.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

In yet another implementation of the technology disclosed, a base web page resulting from a short-lived TCP connection can be logged. A TCP connection that terminates immediately (or some time) after a base web page is loaded by a client (e.g., browser) can be considered a short-lived TCP connection. Once the base web page is loaded, the browser then parses the HTML of the web page and makes a plurality of downstream HTTP requests that invoke the URLs detected in the HTML. In an implementation, a timer can be applied to qualify only those downstream HTTP requests as being child web pages of the base web page: (1) which are invoked before the timer expires and (2) whose referrer header fields refer to a base URL of the base web page. The timer can be initialized when the TCP connection terminates and can last for a predetermined time period (e.g., 3, 5, or 15 seconds). A counter of a base page log object of the base web page can be updated based on the number of qualified downstream HTTP requests, as determined by the two criteria discussed above.

The system can identify an HTTP request as a malicious URL by reference to a black list of malicious URLs. The system can then—(1) initialize a malicious log object, (2) update a first counter of the malicious log object, and (3) report out for use in a further process a summary of the malicious log object. The system can also respond to the malicious URL with at least a warning and by not invoking the malicious URL.

The system can identify an HTTP request as a sensitive URL by analyzing content (e.g., file or document) being transmitted via the HTTP request, i.e., content being uploaded or shared through the HTTP request and/or content being downloaded from the HTTP request. The system analyzes the "en route" or "in transit" content by using a combination of deep application programming interface inspection (DAPII), deep packet inspection (DPI), and/or log inspection to detect user activity and perform data loss prevention (DLP). The system implements the DLP by subjecting the content to content inspection techniques like language-aware data identifier inspection, document fingerprinting, file type detection, keyword search, pattern matching, proximity search, regular expression lookup, exact data matching, metadata extraction, and language-agnostic double-byte character inspection. For additional information about the DAPII, the DPI, and the log inspection, reference can be made to commonly owned U.S. patents application Ser. Nos. 14/198,499; 14/198,508; 14/835,640; 14/835,632; and 62/307,305; Cheng, Ithal, Narayanaswamy, and Malmskog. *Cloud Security For Dummies, Netskope Special Edition*. John Wiley & Sons, Inc. 2015; "*Netskope Introspection*" by Netskope, Inc.; "*Data Loss Prevention and Monitoring in the Cloud*" by Netskope, Inc.; "*Cloud Data Loss Prevention Reference Architecture*" by Netskope, Inc.; "*The 5 Steps to Cloud Confidence*" by Netskope, Inc.; "*The Netskope Reactive Platform*" by Netskope, Inc.; "*The Netskope Advantage: Three "Must-Have" Requirements for Cloud Access Security Brokers*" by Netskope, Inc.; "*The 15 Critical NSS Use Cases*" by Netskope, Inc.; "*Netskope Reactive Cloud DLP*" by Netskope, Inc.; "*Repave the Cloud-Data Breach Collision Course*" by Netskope, Inc.; and "*Netskope Cloud Confidence Index*™" by Netskope, Inc., which are incorporated by reference for all purposes as if fully set forth herein.

After the system identifies the HTTP request as a sensitive URL, the system can then—(1) initialize a sensitive log object, (2) update a first counter of the sensitive log object, and (3) report out for use in a further process a summary of the sensitive log object. The system can also respond to the sensitive URL by either blocking transmission (e.g., uploading, downloading, sharing) of the content, quarantining the content, providing coaching to the user who invoked the sensitive URL, and/or seeking justification from the user on why the user invoked the sensitive URL. In other implementations, the system can respond to the sensitive URL by specially logging the sensitive URL and its referring base web page, if any, in addition to any counting of the sensitive URL as referred or referred from the base web page.

The system can evaluate whether an HTTP request should be designated as the base URL based on at least—(1) a blank or no referrer header field of the HTTP request, (2) a content-length size of corresponding HTTP response above a predetermined threshold, and (3) a text/HTML content-type of the HTTP response. Examples of predetermined thresholds are 30 kB, 35 kB, 100 kB, and 1000 kB.

The system can determine that an HTTP request establishes a long lived connection. The system can then set a timer on the long lived connection. Upon expiration of the timer, the system can—(1) initialize a third base page log object, (2) update a first counter of the third base page log object, and (3) report out for use in a further process a summary of the third base page log object.

In some implementations, after the timer has expired, a further HTTP request can be received during the long lived connection. The system can inspect the further HTTP request and determine whether it has a blank header field or a referrer header field.

If the further HTTP request has a blank header field, the system can set a new timer on the long lived connection. Upon expiration of the new timer, the system can—(1) initialize a fourth base page log object, (2) update a first counter of the fourth base page log object, and (3) report out for use in a further process a summary of the fourth base page log object.

If the further HTTP request has a referrer header field and the referrer header field specifies, as the base URL, the previous HTTP request for which the third base page log object was initialized, the system can attribute statistics of the further HTTP request to the third base page log object. Statistic attribution can include identifying the further HTTP request as a child URL of the previous HTTP request, identifying child URLs of the further HTTP request as grandchild URLs of the previous HTTP request, and updating the first counter of the third base page log object accordingly.

The device running the compact logger client can be a same device from which the HTTP requests originated. The device running the compact logger client can also be a campus-based routing appliance positioned to actively process the HTTP requests.

The device running the compact logger client can be a cloud-based server to which an endpoint routing client, running on a same device from which the HTTP requests originated, routes the HTTP requests. The device running the compact logger client can also be a cloud-based server to which an endpoint routing client, running on a same device from which the HTTP requests originated, routes selected HTTP requests that are not exempted by a bypass list.

Instances of the compact logger client can run on both: (1) a same device from which the HTTP requests originated and (2) a cloud-based server to which an endpoint routing client, running on the same device from which the HTTP requests originated, routes selected HTTP requests that are not exempted by the bypass list.

Other implementations may include a non-transitory computer readable storage medium storing instructions executable by a processor to perform functions of the system described above. Yet another implementation may include a computer-implemented method performing the functions of the system described above.

A computer-implemented method implementation of the technology disclosed includes compact logging of network traffic events. The computer-implemented method includes a compact logger client running on a device receiving a plurality of hypertext transfer protocol (HTTP) requests produced during processing of a base page. The HTTP requests include a base unified resource locator (URL), child URLs, and grandchild URLs.

The computer-implemented method includes identifying some of the HTTP requests as referred or referred from the base URL based on specification of the base URL in respective referrer header fields. It further includes counting the identified HTTP requests as child URLs and updating a first counter of the first base page log object.

The computer-implemented method includes identifying some of the HTTP requests as referred from the child URLs based on specification of one of the child URLs in respective referrer header fields. It further includes counting the identified HTTP requests as grandchild URLs and updating a second counter of the first base page log object.

The computer-implemented method includes identifying a further HTTP request with a blank or no referrer header field as referring to a second base URL of a second base page. It further includes reporting out for use in a further process a summary of the first base page log object and initializing a second base page log object.

Each of the features discussed in this particular implementation section for the system implementations apply equally to this computer-implemented method implementation. As indicated above, all the system features are not repeated here and should be considered repeated by reference.

Other implementations may include a non-transitory computer readable storage medium storing instructions executable by a processor to perform the computer-implemented method described above. Yet another implementation may include a system including memory and one or more processors operable to execute instructions, stored in the memory, to perform the computer-implemented method described above.

Computer readable media (CRM) implementations of the technology disclosed include a non-transitory computer readable storage medium impressed with computer program instructions, when executed on a processor, implement the computer-implemented method described above.

Each of the features discussed in this particular implementation section for the system implementations apply equally to the CRM implementation. As indicated above, all the system features are not repeated here and should be considered repeated by reference.

Another system implementation of the technology disclosed includes one or more processors coupled to the memory. The memory is loaded with computer instructions to compactly log network traffic events. The system includes a compact logger client running on a device that receives a plurality of subordinate unified resource locator (URL) requests produced during loading a base web page.

The system evaluates headers of the subordinate URL requests and identifies some of the subordinate URL requests as referred or referred from the base web page based on specification of a URL of the base web page in respective referrer header fields of the subordinate URL requests.

The system then handles logging of the identified subordinate URL requests as referred from the base web page by—(1) counting the identified subordinate URL requests and (2) logging the count in a log entry for the base web page.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The plurality of subordinate URL requests can include more than 20, 50, 100, or 1000 subordinate URL requests.

The system can receive a transmission control protocol (TCP) connection end event corresponding to the base web page. The system can then—(1) close out counting of the identified subordinate URL requests for the base web page and (2) persist the log entry for the base web page and at least one counter.

The system can time out a persistent TCP connection corresponding to the base web page. The system can then—(1) trigger an artificial connection end event, (2) close out counting of the identified subordinate URL requests for the base web page, (3) persist the log entry for the base web page and at least one counter, and (4) start a further counter for the base web page.

The system can identify subordinate URL requests as referred or referred from the base web page based on at least—(1) a response content-length size below a predetermined threshold and (2) a response content-type other than text/HTML. Examples of predetermined thresholds are 35 kB, 50 kB, 80 kB, 200 kB, and 500 kB. The system can handle logging of the identified subordinate URL requests as referred from the base web page by—(1) counting the identified subordinate URL requests and (2) logging the count in a log entry for the base web page.

The system can identify subordinate URL requests as referred from the base web page based on at least a response content-type other than text/HTML. The system can handle logging of the identified subordinate URL requests as referred from the base web page by—(1) counting the identified subordinate URL requests and (2) logging the count in a log entry for the base web page.

The system can identify a URL request as a malicious URL by reference to a black list of malicious URLs. The system can then specially log the malicious URL and its referring base web page, if any, in addition to any counting of the malicious URL as referred from the base web page.

The device running the compact logger client can be a same device from which the HTTP requests originated. The device running the compact logger client can also be a campus-based routing appliance positioned to actively process the HTTP requests.

The device running the compact logger client can be a cloud-based server to which an endpoint routing client, running on a same device from which the HTTP requests originated, routes the HTTP requests. The device running the compact logger client can also be a cloud-based server to which an endpoint routing client, running on a same device from which the HTTP requests originated, routes selected HTTP requests that are not exempted by a bypass list.

Instances of the compact logger client can run on both: (1) a same device from which the HTTP requests originated and (2) a cloud-based server to which an endpoint routing client, running on the same device from which the HTTP requests originated, routes selected HTTP requests that are not exempted by the bypass list.

Other implementations may include a non-transitory computer readable storage medium storing instructions executable by a processor to perform functions of the system described above. Yet another implementation may include a computer-implemented method performing the functions of the system described above.

Another computer-implemented method implementation of the technology disclosed includes compact logging of network traffic events. The computer-implemented method includes a compact logger client running on a device receiving a plurality of subordinate unified resource locator (URL) requests produced during loading a base web page.

The computer-implemented method then includes evaluating headers of the subordinate URL requests and identifying some of the subordinate URL requests as referred or referred from the base web page based on specification of a URL of the base web page in respective referrer header fields of the subordinate URL requests.

The computer-implemented method further includes handling logging of the identified subordinate URL requests as referred from the base web page by—(1) counting the identified subordinate URL requests and (2) logging the count in a log entry for the base web page.

Each of the features discussed in this particular implementation section for the system implementations apply equally to this computer-implemented method implementation. As indicated above, all the system features are not repeated here and should be considered repeated by reference.

Other implementations may include a non-transitory computer readable storage medium storing instructions executable by a processor to perform the computer-implemented method described above. Yet another implementation may include a system including memory and one or more processors operable to execute instructions, stored in the memory, to perform the computer-implemented method described above.

Computer readable media (CRM) implementations of the technology disclosed include a non-transitory computer readable storage medium impressed with computer program instructions, when executed on a processor, implement the computer-implemented method described above.

Each of the features discussed in this particular implementation section for the system implementations apply equally to the CRM implementation. As indicated above, all the system features are not repeated here and should be considered repeated by reference.

Yet another system implementation of the technology disclosed includes one or more processors coupled to the memory. The memory is loaded with computer instructions to compactly log network traffic events. The system includes a compact logger client running on a device that receives a plurality of hypertext transfer protocol secure (abbreviated HTTPS) requests produced during processing of a base page. The HTTPS requests include a base unified resource locator (URL), child URLs, and grandchild URLs.

The HTTPS requests are secured by secure sockets layer (SSL) or transport layer security (TLS).

The system identifies at least one HTTPS request with a blank or no referrer header field as referring to the base URL. The system then initializes a first base page log object.

Based on specification of the base URL in respective referrer header fields, the system also identifies some of the HTTPS requests as referred from the base URL. The system then—(1) counts the identified HTTPS requests as child URLs and (2) updates a first counter of the first base page log object.

Based on specification of one of the child URLs in respective referrer header fields, the system further identifies some of the HTTPS requests as referred from the child URLs. The system then—(1) counts the identified HTTPS requests as grandchild URLs and (2) updates a second counter of the first base page log object.

The system identifies a further HTTPS request with a blank or no referrer header field as referring to a second base URL of a second base page. The system then—(1) reports out for use in a further process a summary of the first base page log object and (2) initializes a second base page log object.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The system can identify an HTTPS request as a malicious URL by reference to a black list of malicious URLs. The system can then—(1) initialize a malicious log object, (2) update a first counter of the malicious log object, and (3) report out for use in a further process a summary of the malicious log object. The system can also respond to the malicious URL with at least a warning and by not invoking the malicious URL.

The system can identify an HTTPS request as a sensitive URL by analyzing content (e.g., file or document) being transmitted via the HTTPS request, i.e., content being uploaded or shared through the HTTPS request and/or content being downloaded from the HTTPS request. The system analyzes the "en route" or "in transit" content by using a combination of deep application programming interface inspection (DAPII), deep packet inspection (DPI), and/or log inspection to detect user activity and perform data loss prevention (DLP). The system implements the DLP by subjecting the content to content inspection techniques like language-aware data identifier inspection, document fingerprinting, file type detection, keyword search, pattern matching, proximity search, regular expression lookup, exact data matching, metadata extraction, and language-agnostic double-byte character inspection. For additional information about the DAPII, the DPI, and the log inspection, reference can be made to commonly owned U.S. patents application Ser. Nos. 14/198,499; 14/198,508; 14/835,640; 14/835,632; and 62/307,305; Cheng, Ithal, Narayanaswamy, and Malmskog. *Cloud Security For Dummies, Netskope Special Edition*. John Wiley & Sons, Inc. 2015; "*Netskope Introspection*" by Netskope, Inc.; "*Data Loss Prevention and Monitoring in the Cloud*" by Netskope, Inc.; "*Cloud Data Loss Prevention Reference Architecture*" by Netskope, Inc.; "*The 5 Steps to Cloud Confidence*" by Netskope, Inc.; "*The Netskope Reactive Platform*" by Netskope, Inc.; "*The Netskope Advantage: Three "Must-Have" Requirements for Cloud Access Security Brokers*" by Netskope, Inc.; "*The 15 Critical NSS Use Cases*" by Netskope, Inc.; "*Netskope Reactive Cloud DLP*" by Netskope, Inc.; "*Repave the Cloud-Data Breach Collision Course*" by Netskope, Inc.; and "*Netskope Cloud Confidence Index*™" by Netskope, Inc., which are incorporated by reference for all purposes as if fully set forth herein.

After the system identifies the HTTPS request as a sensitive URL, the system can then—(1) initialize a sensitive log object, (2) update a first counter of the sensitive log object, and (3) report out for use in a further process a summary of the sensitive log object. The system can also respond to the sensitive URL by either blocking transmission (e.g., uploading, downloading, sharing) of the content, quarantining the content, providing coaching to the user who invoked the sensitive URL, and/or seeking justification from the user on why the user invoked the sensitive URL. In other implementations, the system can respond to the sensitive URL by specially logging the sensitive URL and its referring base web page, if any, in addition to any counting of the sensitive URL as referred or referred from the base web page.

The system can evaluate whether an HTTPS request should be designated as the base URL based on at least—(1) a blank or no referrer header field of the HTTPS request, (2) a content-length size of corresponding HTTPS response above a predetermined threshold, and (3) a text/HTML content-type of the HTTPS response. Examples of predetermined thresholds are 30 kB, 35 kB, 100 kB, and 1000 kB.

The system can determine that an HTTPS request establishes a long lived connection. The system can then set a timer on the long lived connection. Upon expiration of the timer, the system can—(1) initialize a third base page log object, (2) update a first counter of the third base page log object, and (3) report out for use in a further process a summary of the third base page log object.

In some implementations, after the timer has expired, a further HTTPS request can be received during the long lived connection. The system can inspect the further HTTPS request and determine whether it has a blank header field or a referrer header field.

If the further HTTPS request has a blank header field, the system can set a new timer on the long lived connection.

Upon expiration of the new timer, the system can—(1) initialize a fourth base page log object, (2) update a first counter of the fourth base page log object, and (3) report out for use in a further process a summary of the fourth base page log object.

If the further HTTPS request has a referrer header field and the referrer header field specifies, as the base URL, the previous HTTPS request for which the third base page log object was initialized, the system can attribute statistics of the further HTTPS request to the third base page log object. Statistic attribution can include identifying the further HTTPS request as a child URL of the previous HTTPS request, identifying child URLs of the further HTTPS request as grandchild URLs of the previous HTTPS request, and updating the first counter of the third base page log object accordingly.

The device running the compact logger client can be a same device from which the HTTPS requests originated. The device running the compact logger client can also be a campus-based routing appliance positioned to actively process the HTTPS requests.

The device running the compact logger client can be a cloud-based server to which an endpoint routing client, running on a same device from which the HTTPS requests originated, routes the HTTPS requests. The device running the compact logger client can also be a cloud-based server to which an endpoint routing client, running on a same device from which the HTTPS requests originated, routes selected HTTPS requests that are not exempted by a bypass list.

Instances of the compact logger client can run on both: (1) a same device from which the HTTPS requests originated and (2) a cloud-based server to which an endpoint routing client, running on the same device from which the HTTPS requests originated, routes selected HTTPS requests that are not exempted by the bypass list.

Other implementations may include a non-transitory computer readable storage medium storing instructions executable by a processor to perform functions of the system described above. Yet another implementation may include a computer-implemented method performing the functions of the system described above.

A computer-implemented method implementation of the technology disclosed includes compact logging of network traffic events. The computer-implemented method includes a compact logger client running on a device receiving a plurality of hypertext transfer protocol secure (abbreviated HTTPS) requests produced during processing of a base page. The HTTPS requests include a base unified resource locator (URL), child URLs, and grandchild URLs.

The computer-implemented method includes identifying some of the HTTPS requests as referred or referred from the base URL based on specification of the base URL in respective referrer header fields. It further includes counting the identified HTTPS requests as child URLs and updating a first counter of the first base page log object.

The computer-implemented method includes identifying some of the HTTPS requests as referred from the child URLs based on specification of one of the child URLs in respective referrer header fields. It further includes counting the identified HTTPS requests as grandchild URLs and updating a second counter of the first base page log object.

The computer-implemented method includes identifying a further HTTPS request with a blank or no referrer header field as referring to a second base URL of a second base page. It further includes reporting out for use in a further process a summary of the first base page log object and initializing a second base page log object.

The HTTPS requests are secured by secure sockets layer (SSL) or transport layer security (TLS).

Each of the features discussed in this particular implementation section for the system implementations apply equally to this computer-implemented method implementation. As indicated above, all the system features are not repeated here and should be considered repeated by reference.

Other implementations may include a non-transitory computer readable storage medium storing instructions executable by a processor to perform the computer-implemented method described above. Yet another implementation may include a system including memory and one or more processors operable to execute instructions, stored in the memory, to perform the computer-implemented method described above.

Computer readable media (CRM) implementations of the technology disclosed include a non-transitory computer readable storage medium impressed with computer program instructions, when executed on a processor, implement the computer-implemented method described above.

Each of the features discussed in this particular implementation section for the system implementations apply equally to the CRM implementation. As indicated above, all the system features are not repeated here and should be considered repeated by reference.

The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation, and an HBase™ or DynamoDB™ compatible non-relational database implementation.

The technology disclosed can be implemented using different programming models like MapReduce™, bulk synchronous programming, MPI primitives, etc., or different scalable batch and stream management systems like Amazon Web Services (AWS)™, including Amazon Elasticsearch Service™ and Amazon Kinesis™, Apache Storm™, Apache Spark™, Apache Kafka™, Apache Flink™, Truviso™, IBM Info-Sphere™, Borealis™, and Yahoo! S4™.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A computer-implemented method of efficient request logging, the method including:
   receiving, by a compact logger client, a plurality of requests produced during processing of a base page, wherein the requests consist of HyperText Transfer Protocol Secure (HTTPS) requests, HyperText Transfer Protocol (HTTP) requests, or a combination thereof;
   initializing, by the compact logger client, a first base page log object in response to identifying a base URL identified by a first request of the plurality of requests, wherein initializing the first base page log object comprises linking the first base page log object to a base URL identified by the first request;
   identifying, by the compact logger client, a first subset of the plurality of requests as child URLs based on specification of the base URL in respective referrer header fields of each of the first subset;
   updating, by the compact logger client, a first counter of the first base page log object to reflect a number of the requests in the first subset;
   identifying, by the compact logger client, a second subset of the plurality of requests as grandchild URLs based on specification of one of the child URLs in the respective referrer header fields of each of the second subset;
   updating, by the compact logger client, a second counter of the first base page log object to reflect the number of the requests in the second subset; and
   in response to identifying a second base URL identified by a second request of the plurality of requests:
      reporting out, by the compact logger client, a summary of the first base page log object for use in a further process, and
      initializing, by the compact logger client, a second base page log object linked to the second base URL identified by the second request.

2. The computer-implemented method of claim 1, wherein the first counter and the second counter combined exceed twenty requests.

3. The computer-implemented method of claim 1, further comprising:
   receiving, by the compact logger client, a transmission control protocol ("TCP") connection end event corresponding to the base page;
   closing out, by the compact logger client, the first counter and the second counter; and
   persisting, by the compact logger client, a log entry for the base page including the counts from the first counter and the second counter.

4. The computer-implemented method of claim 1, further comprising:
   identifying, by the compact logger client, one request of the plurality of requests as a malicious URL based on reference to a black list of malicious URLs;
   initializing, by the compact logger client, a malicious log object based on the malicious URL;
   updating, by the compact logger client, a first counter of the malicious log object; and
   reporting out, by the compact logger client, a summary of the malicious log object for use in a further process.

5. The computer-implemented method of claim 4, further comprising:
   responding, by the compact logger client, to the malicious URL with a warning; and
   not invoking the malicious URL.

6. The computer-implemented method of claim 1, further comprising:
   evaluating, by the compact logger client, whether a URL identified by any of the requests of the plurality of requests should be designated as the base URL, based at least in part on:
      the request having no value for the referrer header field,
      a content-length size of a corresponding response above a predetermined threshold, and
      a text/HTML content-type of the corresponding response.

7. The computer-implemented method of claim 1, further comprising:
   determining, by the compact logger client, that the first request establishes a long lived connection;
   setting, by the compact logger client, a timer on the long lived connection; and
   upon expiration of the timer:
      initializing, by the compact logger client, a third base page log object,
      updating, by the compact logger client, a first counter of the third base page log object, and
      reporting out, by the compact logger client, a summary of the third base page log object for use in a further process.

8. The computer-implemented method of claim 1, wherein the compact logger client is executed on a device from which the plurality of requests originate.

9. The computer-implemented method of claim 1, wherein the compact logger client is executed on a campus-based routing appliance positioned to actively process the plurality of requests.

10. The computer-implemented method of claim 1, wherein the compact logger client is executed on a cloud-based server to which an endpoint routing client routes the plurality of requests.

11. The computer-implemented method of claim 1, wherein the compact logger client is executed on a cloud-based server to which an endpoint routing client routes selected requests that are not exempted by a bypass list.

12. The computer-implemented method of claim 1, wherein instances of the compact logger client are executed on both a device from which the requests originate and a cloud-based server to which an endpoint routing client executing on the device routes selected requests that are not exempted by a bypass list.

13. A system, comprising:
   one or more processors; and
   one or more memories having stored thereon instructions that, upon execution by the one or more processors, cause the one or more processors to:
      receive a plurality of requests produced during processing of a base page, wherein the requests consist of HyperText Transfer Protocol Secure (HTTPS) requests, HyperText Transfer Protocol (HTTP) requests, or a combination thereof,
      initialize a first base page log object in response to identifying a base URL identified by a first request of the plurality of requests, wherein initializing the first base page log object comprises linking the first base page log object to a base URL identified by the first request, identify a first subset of the plurality of requests as child URLs based on specification of the base URL in respective referrer header fields of each of the first subset, update a first counter of the first base page log object to reflect a number of the requests in the first subset, identify a second subset of the plurality of requests as grandchild URLs based on specification of one of the child URLs in the respective referrer header fields of each of the second subset, update a second counter of the first base page log object to reflect the number of the requests in the second subset, and in response to identifying a second base URL identified by a second request of the plurality of requests:
report out a summary of the first base page log object for use in a further process; and
initialize a second base page log object linked to the second base URL identified by the second request.

14. The system of claim 13, wherein the first counter and the second counter combined exceed twenty requests.

15. The system of claim 13, wherein the instructions comprise further instructions that, upon execution by the one or more processors, cause the one or more processors to:
receive a transmission control protocol ("TCP") connection end event corresponding to the base page;
close out the first counter and the second counter; and
persist a log entry for the base page including the counts from the first counter and the second counter.

16. The system of claim 13, wherein the instructions comprise further instructions that, upon execution by the one or more processors, cause the one or more processors to:
identify one request of the plurality of requests as a malicious URL based on reference to a black list of malicious URLs;
initialize a malicious log object based on the malicious URL;
update a first counter of the malicious log object; and
report out a summary of the malicious log object for use in a further process.

17. The system of claim 16, wherein the instructions comprise further instructions that, upon execution by the one or more processors, cause the one or more processors to:
respond to the malicious URL with a warning; and
not invoke the malicious URL.

18. The system of claim 13, wherein the instructions comprise further instructions that, upon execution by the one or more processors, cause the one or more processors to:
evaluate whether a URL identified by any of the requests of the plurality of requests should be designated as the base URL, based at least in part on:
the request having no value for the referrer header field,
a content-length size of a corresponding response above a predetermined threshold, and
a text/HTML content-type of the corresponding response.

19. The system of claim 13, wherein the instructions comprise further instructions that, upon execution by the one or more processors, cause the one or more processors to:
determine that the first request establishes a long lived connection;
set a timer on the long lived connection; and
upon expiration of the timer:
initialize a third base page log object,
update a first counter of the third base page log object, and
report out a summary of the third base page log object for use in a further process.

20. The system of claim 13, wherein the instructions comprise further instructions that, upon execution by the one or more processors, cause the one or more processors to:
originate the plurality of requests.

* * * * *